(12) United States Patent
Takahashi et al.

(10) Patent No.: US 8,859,683 B2
(45) Date of Patent: Oct. 14, 2014

(54) OPTICAL RESIN COMPOSITION, OPTICAL RESIN MATERIAL USING THE SAME, OPTICAL FILTER FOR IMAGE DISPLAY DEVICE, AND IMAGE DISPLAY DEVICE

(75) Inventors: Tooru Takahashi, Tsukuba (JP); Yasuhisa Ishida, Chikuse (JP); Hisashige Kanbara, Oyama (JP); Hidekazu Kondou, Hitachi (JP)

(73) Assignee: Hitachi Chemical Company, Ltd., Tokyo (JP)

( * ) Notice: Subject to any disclaimer, the term of this patent is extended or adjusted under 35 U.S.C. 154(b) by 0 days.

(21) Appl. No.: 13/355,600

(22) Filed: Jan. 23, 2012

(65) Prior Publication Data

US 2012/0120347 A1 May 17, 2012

Related U.S. Application Data

(62) Division of application No. 12/438,448, filed as application No. PCT/JP2007/071248 on Oct. 31, 2007.

(30) Foreign Application Priority Data

| Oct. 31, 2006 | (JP) | P2006-296568 |
| Oct. 31, 2006 | (JP) | P2006-296569 |
| Nov. 17, 2006 | (JP) | P2006-311515 |
| Feb. 28, 2007 | (JP) | P2007-049183 |
| Feb. 28, 2007 | (JP) | P2007-049184 |
| Mar. 2, 2007 | (JP) | P2007-052690 |
| Mar. 2, 2007 | (JP) | P2007-052691 |

(51) Int. Cl.

| C08F 265/04 | (2006.01) |
| C08F 267/06 | (2006.01) |
| G02F 1/13 | (2006.01) |
| C08F 265/06 | (2006.01) |
| C08L 51/00 | (2006.01) |
| C08F 2/48 | (2006.01) |
| C08F 290/06 | (2006.01) |
| G02B 1/04 | (2006.01) |
| C08L 33/08 | (2006.01) |
| G02B 1/10 | (2006.01) |
| G02F 1/1335 | (2006.01) |
| C08L 33/02 | (2006.01) |
| C08L 33/06 | (2006.01) |

(52) U.S. Cl.
CPC .............. *G02B 1/105* (2013.01); *C08F 265/06* (2013.01); *G02F 2201/503* (2013.01); *C08L 51/003* (2013.01); *C08F 2/48* (2013.01); *C08F 290/067* (2013.01); *G02B 1/04* (2013.01); *C08F 265/04* (2013.01); *C08L 33/08* (2013.01); *G02F 2201/50* (2013.01); *G02F 1/1335* (2013.01); *C08L 33/02* (2013.01); *C08F 290/061* (2013.01); *C08F 290/06* (2013.01); *C08L 33/066* (2013.01); *C08L 2205/02* (2013.01)
USPC ............ 525/303; 525/302; 428/522; 349/193

(58) Field of Classification Search
USPC .................................. 525/302, 303; 428/522
See application file for complete search history.

(56) References Cited

U.S. PATENT DOCUMENTS

2002/0102369 A1* 8/2002 Shimizu et al. .............. 428/1.33
2004/0115436 A1* 6/2004 Komiya et al. ............ 428/411.1

FOREIGN PATENT DOCUMENTS

| DE | 199 18 134 | 10/2000 |
| DE | 100 61 544 | 6/2002 |

(Continued)

OTHER PUBLICATIONS

English machine translation of Ishida et al. JP 2006-091699A (2006).*

(Continued)

*Primary Examiner* — Peter F Godenschwager

(74) *Attorney, Agent, or Firm* — Antonelli, Terry, Stout & Kraus, LLP.

(57) ABSTRACT

An optical resin composition that is transparent, has suitable adhesion and necessary impact absorption for protection of an image display device etc., not affecting constituent materials of a image display panel, and being excellent in reliability, can be used to provide an optical resin material using the same. The optical resin composition contains (A) a first acrylate derivative that is a compound having one polymerizable unsaturated bond in its molecule, (B) a second acrylate derivative that is a compound having two or more polymerizable unsaturated bonds in its molecule, and (C) an acrylate derivative polymer, and an optical resin material produced by curing reaction of the optical resin composition.

12 Claims, 3 Drawing Sheets

(56) References Cited

FOREIGN PATENT DOCUMENTS

| | | |
|---|---|---|
| JP | 03-204616 | 9/1991 |
| JP | 05-011239 | 1/1993 |
| JP | 06-059253 | 3/1994 |
| JP | 06-333515 | 12/1994 |
| JP | 06-333517 | 12/1994 |
| JP | 2000-265133 | 9/2000 |
| JP | 2003-003132 | 2/2003 |
| JP | 2003-041229 | 2/2003 |
| JP | 2004-058376 | 2/2004 |
| JP | 2004-125868 | 4/2004 |
| JP | 2004-256793 | 9/2004 |
| JP | 2004-263084 | 9/2004 |
| JP | 2005-107199 | 4/2005 |
| JP | 2006-091699 | 4/2006 |
| JP | 2006-193596 | 7/2006 |
| JP | 2006-349736 | 12/2006 |
| JP | 2007-009115 | 1/2007 |
| JP | 2007-009116 | 1/2007 |
| JP | 4743493 | 1/2007 |
| JP | 4743494 | 1/2007 |
| JP | 2007-094191 | 4/2007 |
| JP | 2008-248221 | 10/2008 |
| JP | 2008-250288 | 10/2008 |
| WO | WO 2008/007800 A1 | 1/2008 |
| WO | WO 2008/156136 | 12/2008 |

OTHER PUBLICATIONS

JP Office Action of Appln. No. 2007-284292 dated Jan. 24, 2012 with translation.

Japanese Office Action dated Sep. 6, 2011 with partial English translation.

Japanese Office Action dated Sep. 7, 2011 with English translation.

English translation of International Preliminary Report on Patentability and Written Opinion mailed Jun. 4, 2009, in Application No. PCT/JP2007/071248, filed Oct. 31, 2007.

Chinese Official Action issued Jun. 9, 2010, for Application No. 200780030892.8.

Extended European Search Report, including Supplementary European Search Report and European Search Opinion, dated Oct. 29, 2010, for EP Application No. 07830982.0-2109/2053087 (PCT/JP2007/071248).

Korean Official Action dated Jan. 19, 2011, for KR Application No. 10-2009-7003489.

Communication mailed Oct. 9, 2012, in connection with Korean Patent application No. 10-2011-7016708, 5 pages, Korean Patent Office, Republic of Korea.

Communication mailed Sep. 3, 2013, in connection with Japanese Application No. 2007-284292, 2 pages, Japanese Patent Office, Japan.

Communication mailed Sep. 3, 2013, in connection with Japanese Application No. 2007-284291, 4 pages, Japanese Patent Office, Japan.

English language machine translation of JP 2006-091699 to Ishida et al.

Communication mailed Aug. 16, 2013, in connection with Taiwanese Patent Application No. 10221093140, 5 pages; Taiwanese Patent Office, Taiwan.

\* cited by examiner ary. In particular, there is a possibility that, upon application of an impact to a display, optical characteristics are deteriorated due to generation of bubbles. Patent Document 9 discloses a structure where the thickness of a resin layer is defined and the impact resistance is improved, but fails to give sufficient consideration to a composition of the resin layer, and although giving a disclosure relating to a release film and a light-transmissive substrate, the outermost surface layer has adhesiveness. When a resin is kept in the state of sticking to a release film for a prolonged period of time, a surface property is deteriorated, which is problematic for a film in industrial use.

OPTICAL RESIN COMPOSITION, OPTICAL RESIN MATERIAL USING THE SAME, OPTICAL FILTER FOR IMAGE DISPLAY DEVICE, AND IMAGE DISPLAY DEVICE

CROSS-REFERENCE TO RELATED APPLICATION

This application is a divisional application of U.S. Application Ser. No. 12/438,448, filed Feb. 23, 2009, the contents of which are incorporated herein by reference which is a National Stage application filed under 35 USC 371, of International (PCT) Application No. PCT/JP2007/071248, filed Oct. 31, 2007.

TECHNICAL FIELD

The present invention relates to an optical resin composition and an optical resin material, which are useful in inhibiting breakage of an image display panel or in absorbing stress and impact and are excellent in transparency.

The present invention also relates to an optical filter for image display device and an image display device, which have an optical resin composition or an optical resin material which is useful in inhibiting breakage of an image display device or in absorbing stress and impact and is excellent in transparency.

BACKGROUND ART

A representative image display panel is exemplified by liquid crystal display (LCD). The liquid crystal display is a thin and easily damaged display component consisting of transparent electrodes, a liquid crystal cell having a liquid crystal charged and sealed via a gap of few microns between glass substrates of about 1 mm in thickness with a pixel pattern etc. formed thereon, and an optical film or the like (for example, a polarization plate) stuck to both external sides of the cell. Particularly for use in cell phones, game machines, digital cameras, and in-car products, therefore, a liquid crystal display having a structure wherein a transparent front plate (protective panel) is arranged with a predetermined space in front of the liquid crystal display is generally used.

Large liquid crystal displays prevailing at present are those wherein the surface of a front polarization plate for liquid crystal panel has been subjected to antiglare (AG) treatment for reflection reduction. In the case of this structure, no measure is taken for impact absorption, and impact resistance is given by a structure of the whole of a panel and a set. The problem of this structure is that an image seems blurred by AG treatment, the panel is warped upon touching the surface, to disorder an image, stains are hardly removed due to AG treatment, and upon strong rubbing, flaws are easily caused, and also that as the size of a panel will be increasing in future, the impact resistance of the panel would be reduced to be problematic in impact resistance.

Accordingly, it is conceivable that a front plate subjected to antireflection (AR) treatment is placed in front of a liquid crystal panel, to overcome disadvantages originating from AG treatment. In this case, however, a reduction in transmittance and a deterioration in image quality due to ghost image would be caused when air exists the space between the front plate and the liquid crystal panel, so filling the space with a resin etc. has been proposed (Patent Documents 1, 2, 3 and 4).

It is determined under UL standards, the Radio Wave Control Act, etc. that a cathode ray tube (CRT) made of glass, when used in an image display device (display) (including a television), be free of scattering or not liable to penetration in an impact resistance test with a dropping steel ball.

Accordingly, to implement this standard, the glass of CRT should be designed to be thick, which results in an increase in the weight of CRT. As a means of conferring antiscattering property without increasing the thickness of the glass, a method of laminating a self-restoring, synthetic resin protective film on the glass has been proposed (see Patent Documents 5 and 6). This proposal is characterized by antiscattering property, but does not meet prevention of glass breakage.

On the other hand, PDP that is one kind of flat panel display (FPD) is provided via an about 1 to 5 mm space with a front plate (e.g., glass) of about 3 mm in thickness in front (viewable side) of PDP in order to prevent breakage. Accordingly, the area of the front plate increases with an increasing size of PDP, thus increasing the weight of PDP.

Accordingly, it has been proposed for prevention of breakage of an image display device (display) that a specific resin is laminated on the surface of the display, or an optical filter having a specific resin laminated thereon is laminated on the surface of the display (see Patent Documents 7, 8 and 9).

Patent Document 1: Japanese Patent Application Laid-Open (JP-A) No. 05-011239
Patent Document 2: Japanese Patent Application Laid-Open (JP-A) No. 03-204616
Patent Document 3: Japanese Patent Application Laid-Open (JP-A) No. 06-59253
Patent Document 4: Japanese Patent Application Laid-Open (JP-A) No. 2004-125868
Patent Document 5: Japanese Patent Application Laid-Open (JP-A) No. 06-333515
Patent Document 6: Japanese Patent Application Laid-Open (JP-A) No. 06-333517
Patent Document 7: Japanese Patent Application Laid-Open (JP-A) No. 2004-58376
Patent Document 8: Japanese Patent Application Laid-Open (JP-A) No. 2005-107199
Patent Document 9: Japanese Patent Application Laid-Open (JP-A) No. 2004-263084

DISCLOSURE OF INVENTION

Problems to be Solved by the Invention

However, oil used in Patent Document 1 is hardly sealed for preventing leakage and may affect materials used in a liquid crystal panel, and when a front plate is cracked, there arises a problem of oil leakage. Unsaturated polyester in Patent Document 2 is easily yellowed and its application to the display is not desirable. Silicone in Patent Document 3 is poor in adhesiveness and thus requires an additional pressure-sensitive adhesive for fixation, to make the process complicated, and does not have strong adhesiveness to the pressure-sensitive adhesive and is thus released upon application of an impact, to cause a problem of inclusion of bubbles. A polymer of acrylic monomers in Patent Document 4, although not requiring an additional pressure-sensitive adhesive when used in small instruments, is still poor in adhesiveness and requires an additional pressure-sensitive adhesive when used in supporting a front plate of a large display, thus making the process complicated. The starting material is composed exclusively of monomers and thus has low viscosity and high curing shrinkage, to cause a problem of difficult formation of a large area uniform film.

In Patent Documents 7 and 8, there is no particular consideration given to a composition of resin materials used, and a means for exhibiting adhesiveness or transparency is ambiguous. Particularly in Patent Document 7, there is no consideration given to humidity resistance reliability of resin, and when resin materials in a composition specifically shown in the Examples are used, the resin after application to a display becomes clouded in a humidity resistance test in a short time. In Patent Document 8, acrylic acid is used as a part of resin specifically shown in the Examples, and the resin becomes clouded in a humidity resistance test in a long time and causes a problem of corroding a metal with which the resin is contacted in the humidity resistance test. Examination in Patent Documents 7 and 8 is considered insufficient from the viewpoint of attaining more excellent impact absorption. In Patent Document 8, the thickness of an impact-resistant layer using resin is defined in the range of 0.2 to 1 mm, which is however not a disclosure from the viewpoint of improving impact absorption by increasing the thickness. In Patent Document 9, there is consideration given to resistance to humidity and heat, but given a resin starting material composition described in this patent document, it is not possible to expect significant improvement in impact resistance. The thickness of a resin layer in the Examples is 1 mm, and from the viewpoint of attaining more excellent impact absorption, examination is considered insufficient. When a resin relatively soft after curing, as described in the Examples in Patent Document 9, is used thickly, it is considered that the surface hardness of the resulting front filter is reduced to cause a problem in abrasion resistance.

Accordingly, a first object of the present invention is to provide an optical resin composition being transparent, having suitable adhesion and necessary impact absorption for protection of an image display device etc., and not affecting constituent materials of a image display panel etc., and an optical resin material using the same.

A second object of the present invention is to provide an optical resin composition excellent in reliability in moisture resistance, and an optical resin material using the same.

A third object of the present invention is to provide an optical filter for an image display device having an optical resin composition being transparent, having suitable adhesion and necessary impact absorption for protection of an image display device, not affecting constituent materials of a image display panel, and being excellent in reliability in moisture resistance, and an optical resin material using the same.

A fourth object of the present invention is to provide an image display device having impact resistance and attaining a vivid image of high contrast without ghost image.

Means for Solving the Problems

The means for solving the problems is as follows.

(1) An optical resin composition containing (A) a first acrylate derivative that is a compound having one polymerizable unsaturated bond in its molecule, (B) a second acrylate derivative that is a compound having two or more polymerizable unsaturated bonds in its molecule, and (C) an acrylate derivative polymer.

(2) The optical resin composition according to the above-mentioned (1), wherein (B) the second acrylate derivative is a high-molecular-weight crosslinking agent.

(3) The optical resin composition according to the above-mentioned (1) or (2), wherein the compounding amounts of the respective components based on 100 parts by weight of (A) the first acrylate derivative, (B) the second acrylate derivative and (C) the acrylate derivative polymer in total are (A) 14 to 89.49 parts by weight, (B) 0.1 to 50 parts by weight, and (C) 10 to 80 parts by weight.

(4) The optical resin composition according to the above-mentioned (1), wherein:

(A) the first acrylate derivative consists of a mixture of an alkyl acrylate having an alkyl group containing 4 to 18 carbons (referred to hereinafter as AA monomer) and a hydroxyl-containing acrylate represented by the following general formula (I) (referred to hereinafter as HA monomer):

$$CH_2=CHCOO(C_mH_{2m}O)_nH \qquad \text{General Formula (I)}$$

wherein m is 2, 3 or 4, and n is an integer of 1 to 10, (C) the acrylate derivative polymer is a copolymer obtained by polymerizing AA monomer with HA monomer, and the HA monomer is incorporated such that the proportion (M % by mass) of HA monomer in (A) the first acrylate derivative and the proportion (P % by mass) of HA monomer in (C) the acrylate derivative polymer satisfy the following relationship:

$$-8 \leq (P-M) \leq 8 \qquad \text{Formula (I)}$$

(5) The optical resin composition according to the above-mentioned (4), wherein (A) the first acrylate derivative is a mixture produced by mixing AA monomer at a proportion of 50 to 87% by weight with HA monomer at 13 to 50% by weight, and (C) the acrylate derivative polymer is a copolymer produced by polymerizing AA monomer at a proportion of 50 to 87% by weight with HA monomer at 13 to 50% by weight.

(6) The optical resin composition according to the above-mentioned (4) or (5), wherein the compounding amounts of the respective components based on 100 parts by weight of (A) the first acrylate derivative, (B) the second acrylate derivative and (C) the acrylate derivative polymer in total are (A) 36 to 84.49 parts by weight, (B) 0.5 to 50 parts by weight and (C) 15 to 60 parts by weight.

(7) The optical resin composition according to any of the above-mentioned (1), (2), (4) or (5) which further contains (D) a polymerization initiator.

(8) The optical resin composition according to the above-mentioned (7), wherein the compounding amount of (D) the polymerization initiator based on 100 parts by weight of (A) the first acrylate derivative, (B) the second acrylate derivative, (C) the acrylate derivative polymer and (D) the polymerization initiator in total is 0.01 to 5 parts by weight.

(9) The optical resin composition according to the above-mentioned (7), wherein (D1) a photopolymerization initiator is contained as (D) the polymerization initiator.

(10) The optical resin composition according to the above-mentioned (9), wherein the compounding amount of (D1) the photopolymerization initiator based on 100 parts by weight of (A) the first acrylate derivative, (B) the second acrylate derivative, (C) the acrylate derivative polymer and (D1) the photopolymerization initiator in total is 0.1 to 5 parts by weight.

(11) The optical resin composition according to the above-mentioned (9), wherein (D1) the photopolymerization initiator is at least one member selected from the group consisting of an α-hydroxyalkyl phenone compound, an acylphosphine oxide compound, oligo(2-hydroxy-2-methyl-1-(4-(1-methylvinyl)phenyl)propanone, and a mixture of oxy-phenyl-acetic acid 2-[2-oxo-2-phenyl-acetoxy-ethoxy]-ethyl ester and oxy-phenyl-acetic acid 2-[2-hydroxy-ethoxy]-ethyl ester.

(12) The optical resin composition according to any of the above-mentioned (4) or (5), wherein the AA monomer is 2-ethylhexyl acrylate, isooctyl acrylate and/or n-octyl acrylate, and the HA monomer is at least one member selected from the group consisting of 2-hydroxyethyl acrylate, 1-hydroxyethyl acrylate, 2-hydroxypropyl acrylate, 3-hydroxypropyl acrylate, 1-hydroxypropyl acrylate, 4-hydroxybutyl acrylate, 3-hydroxybutyl acrylate, 2-hydroxybutyl acrylate, and 1-hydroxybutyl acrylate.

(13) The optical resin composition according to any of the above-mentioned (1), (2), (4) or (5), wherein the weight-average molecular weight of (C) the acrylate derivative polymer is 100,000 to 700,000.

(14) The optical resin composition according to any of the above-mentioned (9), wherein the compounding amounts of the respective components based on 100 parts by weight of (A) the first acrylate derivative, (B) the second acrylate derivative, (C) the acrylate derivative polymer and the (D1) photopolymerization initiator in total are (A) 15 to 40 parts by weight, (B) 5 to 40 parts by weight, (C) 39 to 59 parts by weight and (D1) 0.5 to 2.0 parts by weight.

(15) The optical resin composition according to any of the above-mentioned (2), wherein the high-molecular-weight crosslinking agent includes a alkylene glycol containing 1 to 4 carbons as a part of its starting material and has a weight-average molecular weight of 4,000 to 20,000.

(16) An optical resin material produced by curing reaction of the optical resin composition according to any of the above-mentioned (1), (2), (4) or (5).

(17) The optical resin material according to the above-mentioned (16), which is sheet-shaped or film-shaped.

(18) An optical filter for image display device, which has a layer consisting of an optical resin material produced by curing the optical resin composition according to any of the above-mentioned (1) (2), (4) or (5).

(19) An image display device having, in a viewable side, a layer consisting of an optical resin material produced by curing the optical resin composition according to any of the above-mentioned (1) (2), (4) or (5).

(20) An image display device having a layer consisting of an optical resin material produced by curing the optical resin composition according to any of the above-mentioned (1) (2), (4) or (5), between an image display panel and a front panel or a transparent protective substrate.

Effect of the Invention

The optical resin composition of the present invention after curing reaction has excellent impact absorption and is excellent in transparency.

The optical resin composition of the present invention, because of a similar composition between polymers and monomers therein, can increase the solubility of the polymers, can prepare a transparent resin composition or cured product even when a high-molecular-weight polymer is used, and is excellent in reliability in humidity resistance. The optical resin composition has been diluted with monomers and can thus be formed in the absence of a solvent to prepare a bubble-free thick film or sheet.

The optical resin composition of the present invention contains a high-molecular-weight polymer at a relatively high concentration, and is thus excellent in impact absorption even when formed into a film of thin thickness. Accordingly, the resulting film has hardness to enable prevention abrasion resistance from decreasing. Due to this hardness, the film is hardly plastically deformed and can exhibit more excellent impact absorption with thicker film thickness. The film has strong cohesion and flexibility and is thus free of cracking and lining upon bending or winding on a roll.

By using a high-molecular-weight crosslinking agent, the composition can prevent adhesion from varying due to an error in compounding, so a film or sheet excellent in characteristic stability can be manufactured. The optical resin composition of the present invention does not affect materials generally used in image display devices such as liquid crystal display and PDP.

The optical resin material of the present invention can be obtained by curing reaction of the optical resin composition of the present invention, and can be easily shaped into a sheet. This optical resin material has been endowed with adhesiveness and can thus be stuck to a substrate such as glass and the like without using a pressure-sensitive adhesive or an adhesive.

An optical filter for an image display device and an image display device, such as liquid crystal display provided with a transparent resin layer obtained by using the optical resin composition or the optical resin material succeed to the working effect of the optical resin composition and the optical resin material.

The optical resin composition and the optical resin material of the present invention are used suitably as those forming a transparent resin layer in front of an image display panel.

According to the present invention, there can be provided an optical filter for an image display device, which is transparent, has impact absorption, and is excellent in reliability in humidity resistance.

According to the present invention, there can also be provided an image display device which has impact resistance and gives a vivid image of high contrast without ghost image.

DESCRIPTION OF NUMERALS

Figure 1:
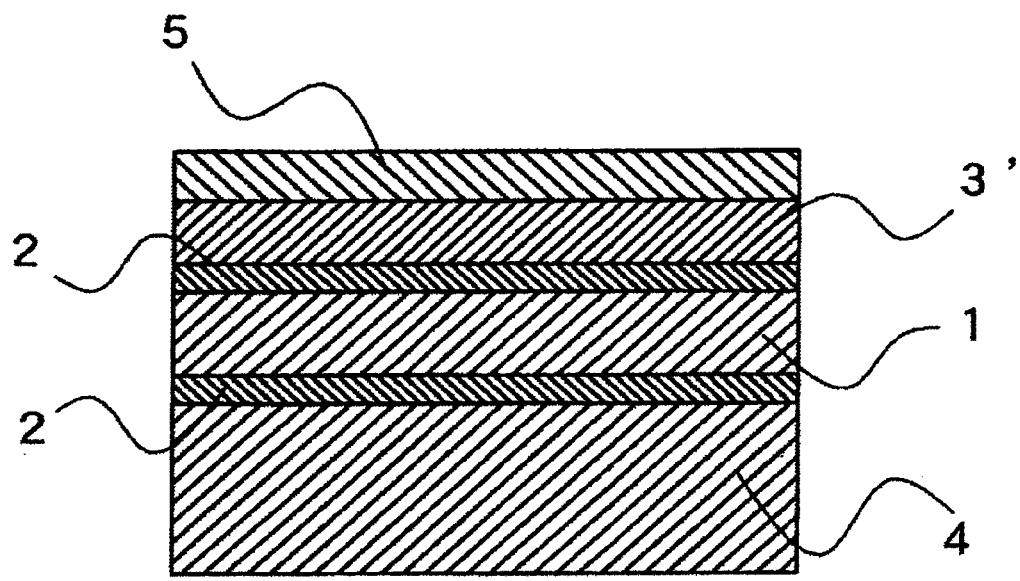
FIG. 1 is a schematic cross-sectional view showing a liquid crystal display using the optical resin material of the present invention.

1 Liquid crystal display cell
2 Polarization plate
3 Gap (air layer)
3' Optical resin material
4 Backlight system
5 Transparent protective substrate

BEST MODE FOR CARRYING OUT THE INVENTION

Hereinafter, the optical resin composition, the optical resin material, the optical filter and the image display device according to the present invention are described.

In this specification, "acrylic acid" as in acrylate derivative shall include "methacrylic acid".

<Optical Resin Composition>

The optical resin composition of the present invention is an optical resin composition containing (A) a first acrylate derivative that is a compound having one polymerizable unsaturated bond in its molecule, (B) a second acrylate derivative that is a compound having two or more polymerizable unsaturated bonds in its molecule, and (C) an acrylate derivative polymer. Hereinafter, the components contained in the optical resin composition of the present invention are described respectively.

[(A) First Acrylate Derivative]

In the present invention, (A) the first acrylate derivative includes an acrylate or methacrylate having one polymerizable unsaturated bond in its molecule, and derivative thereof etc. Specific examples of the compound having one polymerizable unsaturated bond in its molecule include alkyl methacrylates such as methyl methacrylate, n-butyl methacrylate, i-butyl methacrylate, 2-ethylhexyl methacrylate, isonoyl methacrylate, n-octyl methacrylate, lauryl methacrylate, and stearyl methacrylate, alkyl acrylates such as methyl acrylate, n-butyl acrylate, i-butyl acrylate, 2-ethylhexyl acrylate, isonoyl acrylate, and n-octyl acrylate, aralkyl methacrylates such as benzyl methacrylate, aralkyl acrylates such as benzyl acrylate, alkoxyalkyl methacrylates such as butoxyethyl methacrylate, alkoxyalkyl acrylates such as butoxyethyl acrylate, aminoalkyl methacrylates such as N,N-dimethylaminoethyl methacrylate, aminoalkyl acrylates such as N,N-dimethylaminoethyl acrylate, polyalkylene glycol alkyl ether acrylate such as diethylene glycol ethyl ether methacrylate, triethylene glycol butyl ether methacrylate, and dipropylene glycol methyl ether methacrylate, polyalkylene glycol alkyl ether methacrylates such as diethylene glycol ethyl ether acrylate, triethylene glycol butyl ether acrylate, and dipropylene glycol methyl ether acrylate, polyalkylene glycol aryl ether methacrylates such as hexaethylene glycol phenyl ether methacrylate, polyalkylene glycol aryl ether acrylates such as hexaethylene glycol phenyl ether acrylate, alicyclic group-containing methacrylates or acrylates such as cyclohexyl methacrylate, cyclohexyl acrylate, dicyclopetanyl methacrylate, dicyclopentanyl acrylate, isobornyl methacrylate, methoxylated cyclodecatriene methacrylate, isobornyl acrylate, and methoxylated cyclodecatriene acrylate, fluorinated alkyl methacrylates such as heptadecaflorodecyl methacrylate, fluorinated alkyl acrylates such as heptadecaflorodecyl acrylate, hydroxyl-containing methacrylates or acrylates such as 2-hydroxyethylmethacrylate, 3-hydroxypropyl methacrylate, 4-hydroxybutyl methacrylate, 2-hydroxyethyl acrylate, 3-hydroxypropyl acrylate, 4-hydroxybutyl acrylate, glycerol methacrylate, and glycerol acrylate, carboxyl-containing methacrylate or acrylate such as acrylate and methacrylate, glycidyl-containing methacrylates or acrylates such as glycidyl methacrylate and glycidyl acrylate, and acrylamide.

These compounds having one polymerizable unsaturated bond in its molecule may be used alone or as a mixture of two or more thereof.

[(B) Second Acrylate Derivative]

In the present invention, (B) the second acrylate derivative includes an acrylate or methacrylate having two or more polymerizable unsaturated bonds in its molecule, or derivatives thereof, and is particularly preferably a compound having two or more acryloyl groups in its molecule. The second acrylate derivatives, when classified depending on molecular weight, include (1) those having low-molecular weight of less than 1000, (2) those having middle-molecular weight of 1000 to 4000, and (3) those having high-molecular weight of 4000 or more, which will be described respectively.

Among (1) the second acrylate derivatives, those having low-molecular weight include acrylate monomers such as bisphenol A diacrylate, 1,4-butanediol diacrylate, 1,6-hexanediol diacrylate, 1,9-nonanediol diacrylate, 1,3-butylene glycol diacrylate, diethylene glycol diacrylate, tripropylene glycol diacrylate, glycerol diacrylate, neopentyl glycol diacrylate, polyethylene glycol diacrylate, polypropylene glycol diacrylate, polybutylene glycol diacrylate, trimethylol propane triacrylate, pentaerythritol triacrylate, tris(acryloxyethyl)isocyanurate, pentaerythritol tetraacrylate, dipentaerythritol tetraacrylate, dipentaerythritol hexaacrylate, and dipentaerythritol pentaacrylate, and acryl oligomers such as epoxy acrylate, polyester acrylate, urethane acrylate and acryl acrylate, among which diacrylates such as 1,6-hexanediol diacrylate, 1,9-nonanediol diacrylate, tripropylene glycol diacrylate, polyethylene glycol diacrylate, and polypropylene glycol diacrylate are preferable. From the above-described compounds having two or more polymerizable unsaturated bonds in its molecule, those having two or more acryloyl groups in its molecule can also be suitably selected and used.

Among (2) the second acrylate derivatives, those having middle-molecular weight include:

diacrylate compounds of an alkylene oxide adduct of bisphenol A (or those compounds having their acryloyl groups replaced by methacryloyl groups) represented by the following general formula (a):

[Chemical Formula 1]

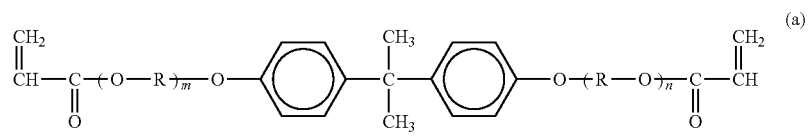

(a)

wherein R represents an ethylene group or a propylene group, and m and n independently represents an integer of 1 to 20, esterified compounds to which an epichlorohydrin modified product of bisphenol A, and acrylic acid, were added (or those compounds having their acryloyl groups replaced by methacryloyl groups) represented by the following general formula (b):

[Chemical Formula 2]

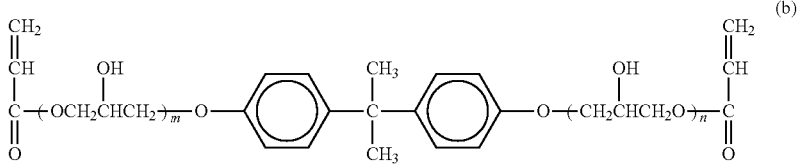

(b)

wherein m and n independently represent an integer of 1 to 10, diacrylate compounds of an alkylene oxide adduct of phosphoric acid (or those compounds having their acryloyl groups replaced by methacryloyl groups) represented by the following general formula (c):

[Chemical Formula 3]

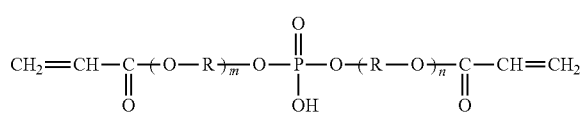

(c)

wherein R represents an ethylene group or a propylene group, and m and n independently represents an integer of 1 to 20, esterified compounds to which an epichlorohydrin modified product of phthalic acid, and acrylic acid, were added (or those compounds having their acryloyl groups replaced by methacryloyl groups) represented by the general formula (d):

[Chemical Formula 4]

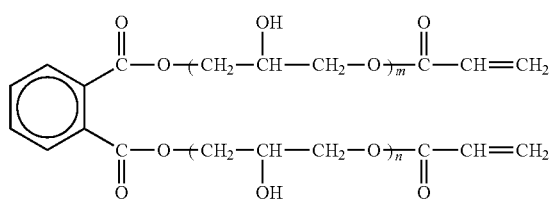

(d)

wherein m and n independently represent an integer of 1 to 10, esterified compounds (having two acryl groups in one molecule) to which an epichlorohydrin modified product of 1,6-hexanediol, and acrylic acid, were added (or those compounds having their acryloyl groups replaced by methacryloyl groups) represented by the following general formula (e):

[Chemical Formula 5]

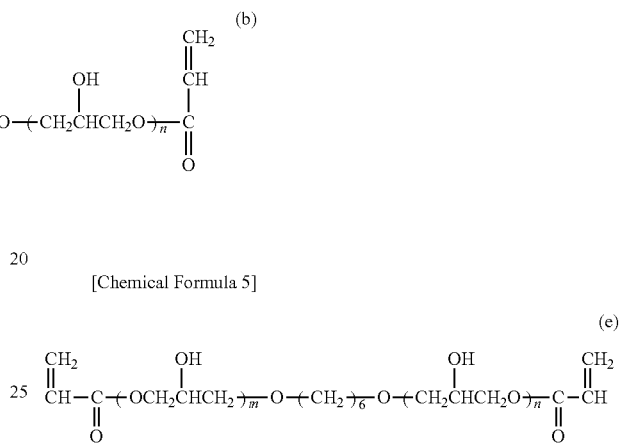

(e)

wherein m and n independently represent an integer of 1 to 20, triacrylate compounds of an alkylene oxide adduct of phosphoric acid (or those compounds having their acryloyl groups replaced by methacryloyl groups) represented by the following general formula (f):

[Chemical Formula 6]

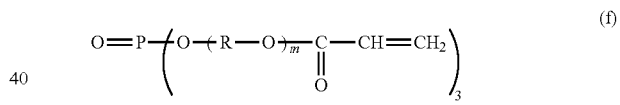

(f)

wherein R represents an ethylene group or a propylene group, and three m's independently represent an integer of 1 to 20, and triacrylate compounds of an alkylene oxide adduct of trimethylol propane (or those compounds having their acryloyl groups replaced by methacryloyl groups) represented by the following general formula (g):

[Chemical Formula 7]

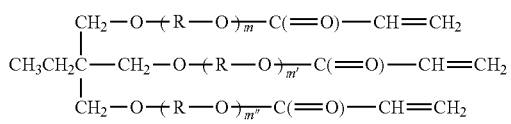

(g)

wherein R represents an ethylene group or a propylene group, and m, m' and m" independently represent an integer of 1 to 20. These monomers can be used alone or as a combination of two or more thereof.

Among (3) the second acrylate derivatives, those having high-molecular weight include a high-molecular-weight compound having two or more reactive unsaturated bonds (referred to in this specification as "high-molecular-weight crosslinking agent") and are preferably those having a weight-average molecular weight of 4,000 to 20,000, still more preferably 8,000 to 16,000. When the molecular weight of the high-molecular-weight crosslinking agent is less than 4,000, a cured product is made easily brittle, while when the molecular weight is higher than 20,000, the viscosity of the composition becomes too high, thus making formation of a sheet difficult. From the viewpoint of compatibility, the high-molecular-weight crosslinking agent is preferably one using alkylene glycol containing 1 to 4 carbons as a part of its starting material.

The high-molecular-weight crosslinking agent includes:

(a) Dialcohol compound di(meth)acrylates which are obtained for example by reacting acrylic acid or methacrylic acid with a polyalkylene glycol such as polyethylene glycol, polypropylene glycol and polybutylene glycol.

(b) Epoxy resin di(meth)acrylates which are obtained for example by reacting acrylic acid or methacrylic acid with an epoxy resin having two epoxy groups in its molecule, such as diglycidyl ether of polyalkylene glycol such as polyethylene glycol, polypropylene glycol and polybutylene glycol.

(c) Di(meth)acrylates of polyesters having hydroxy groups at both terminals, which are produced specifically by reacting polyester polyols with saturated acid and polyhydric alcohol. The saturated acid includes aliphatic dicarboxylic acids such as azelaic acid, adipic acid and sebacic acid, and the polyhydric alcohol includes such as ethylene glycol, propylene glycol, diethylene glycol, dipropylene glycol, butylene glycol, polyethylene glycol and polypropylene glycol. The di(meth)acrylates of polyesters can be obtained by reacting such polyester polyols with acrylic acid or methacrylic acid.

(d) Polyurethane di(meth)acrylates; specifically polyurethane is obtained by reacting a polyhydric alcohol compound with a polyhydric isocyanate compound. The polyhydric alcohol includes such as propylene glycol, tetramethylene glycol, 1,4-butane diol, 1,5-pentane diol, 1,6-hexane diol, neopentyl glycol, 1,4-cyclohexane dimethanol, 2-methyl-1,8-octane diol, 1,9-nonane diol, 3-methyl-1,5-pentane diol, poly-1,2-butylene glycol, polypropylene glycol, polytetramethylene glycol, an ethylene glycol-propylene glycol/block copolymer, an ethylene glycol-tetramethylene glycol copolymer, methyl pentane diol-modified polytetramethylene glycol, propylene glycol-modified polytetramethylene glycol, a propylene oxide adduct of bisphenol A, a propylene oxide adduct of hydrogenated bisphenol A, a propylene oxide adduct of bisphenol F, and a propylene oxide adduct of hydrogenated bisphenol F. The polyhydric isocyanate compound includes diisocyanates such as tolylene diisocyanate, xylylene diisocyanate, diphenyl methane diisocyanate, hexamethylene diisocyanate, trimethyl hexamethylene diisocyanate, tetramethyl xylylene diisocyanate, isophorone diisocyanate, hydrogenated tolylene diisocyanate, hydrogenated xylylene diisocyanate, hydrogenated diphenyl methane diisocyanate and norbornene diisocyanate, and polymers of the above diisocyanates or urea-modified or burette-modified diisocyanates. These polyhydric alcohols and polyhydric isocyanates may be used alone or as a combination of two or more thereof.

The polyurethane di(meth)acrylate can be obtained by reacting acrylic acid or methacrylic acid with such polyurethane that is a compound having a hydroxyl group at a terminal obtained by reacting with an excess of polyhydric alcohol.

(e) Compounds obtained by reacting polyurethane with a compound having a hydroxyl group and a reactive double bond; specifically the polyhydric alcohol and the polyhydric isocyanate compound as the polyurethane starting materials are the same as described above.

Such polyurethane that is a compound having an isocyanate group at a terminal obtained by reacting with an excess of polyhydric isocyanate can be reacted with a compound having a hydroxyl group and a reactive double bond, to form reactive double bond-terminated polyurethane.

The compound having a hydroxyl group and a reactive double bond include acrylate derivatives such as 2-hydroxyethyl acrylate, 2-hydroxypropyl acrylate, 3-hydroxypropyl acrylate, 4-hydroxybutyl acrylate, polyethylene glycol monoacrylate, polypropylene glycol monoacrylate, ethylene glycol-propylene glycol/block copolymer monoacrylate, ethylene glycol-tetramethylene glycol copolymer monoacrylate, caprolactone-modified monoacrylate (trade name: Plaqucell FA series, manufactured by DAICEL CHEMICAL INDUSTRIES, LTD.) and pentaerythritol triacrylate, and methacrylate derivatives such as 2-hydroxyethyl methacrylate, 2-hydroxypropyl methacrylate, 3-hydroxypropyl methacrylate, 4-hydroxybutyl methacrylate, polyethylene glycol monomethacrylate, polypropylene glycol monomethacrylate, ethylene glycol-propylene glycol/block copolymer monomethacrylate, ethylene glycol-tetramethylene glycol copolymer monomethacrylate, caprolactone-modified monomethacrylate (trade name: Plaqucell FM series, manufactured by DAICEL CHEMICAL INDUSTRIES, LTD.) and pentaerythritol trimethacrylate. These compounds are used alone or as a mixture of two or more thereof.

From the toughness of a cured product, the high-molecular-weight crosslinking agent is preferably polyurethane di(meth)acrylate and reactive double bond-terminated polyurethane (particularly one having reactive double bonds based on acryloyl groups). Among them, the high-molecular-weight crosslinking agent is used preferably polyurethane whose diol component consists of polypropylene glycol or polytetramethylene glycol, more preferably one whose diol component is polypropylene glycol or polytetramethylene glycol and whose diisocyanate component is isophorone diisocyanate.

When (C) the acrylate derivative polymer described later is poor in compatibility with the high-molecular-weight crosslinking agent, the cured product becomes clouded if the amount of the high-molecular-weight crosslinking agent is increased. By using an alkylene glycol in the starting material of the high-molecular-weight crosslinking agent, the compatibility with the polymer can be improved and the transparency can be maintained regardless of the amount of the high-molecular-weight crosslinking agent. By using the high-molecular-weight crosslinking agent, the cured product can be prevented from becoming brittle or lowering adhesion to a considerable degree even if the high-molecular-weight crosslinking agent is used in a relatively large amount. Accordingly, the amount of the crosslinking agent used can be increased, and characteristics of the cured product can be prevented from changing due to an error in compounding.

The method of synthesizing the high-molecular-weight crosslinking agent may be any of known polymerization methods such as bulk polymerization, solution polymerization, suspension polymerization and emulsion polymerization can be used. These methods can also be applied to synthesis of (C) the acrylate derivative polymer described later.

The high-molecular-weight crosslinking agents described above can be used alone or as a mixture of two or more thereof. The high-molecular-weight compound, that is, the high-molecular-weight crosslinking agent, is preferably used as (B) the second acrylate derivative.

[(C) Acrylate Derivative Polymer]

(C) The acrylate derivative polymer according to the present invention is obtained by polymerization of a compound having one polymerizable unsaturated bond in its molecule (component (A)) among acrylate derivatives, or may be obtained by copolymerizing it with a compound having two or more polymerizable unsaturated bonds in its molecule (component (B)) in such a range that the effect of the present invention is not hindered.

The weight-average molecular weight (determined by using a calibration curve of standard polystyrenes by gel permeation chromatography; this applies hereinafter) is preferably 100,000 to 700,000, more preferably 150,000 to 400,000, still more preferably 200,000 to 350,000.

(C) The acrylate derivative polymer may be a polymer obtained by polymerizing one or more compounds having one polymerizable unsaturated bond in its molecule or may be obtained by polymerizing them with polymerizable compounds other than acrylate derivatives.

The polymerizable compounds other than acrylate derivatives may be compounds having one polymerizable unsaturated bond in its molecule, such as acrylonitrile, styrene, vinyl acetate, ethylene and propylene, besides (A) the first acrylate derivative can be used. The polymerizable compounds other than acrylate derivatives may be compounds having two or more polymerizable unsaturated bonds in its molecule (divinyl benzene or the like) other than the second acrylate derivative can be used.

In the formulation of the optical resin composition of the present invention, (A) the first acrylate derivative can be used in regulating the viscosity of the composition. (B) The second acrylate derivative is used preferably in retaining the shape of a cured product of the composition.

(C) The acrylate derivative polymer is used preferably in improving mechanical characteristics. By using (C) the acrylate derivative polymer, curing shrinkage can be suppressed.

The preferable amounts of the respective components in the optical resin composition of the present invention, based on 100 parts by weight of (A) the first acrylate derivative, (B) the second acrylate derivative and (C) the acrylate derivative polymer in total, are as follows:

(A) the first acrylate derivative is preferably 14 to 89.49 parts by weight, more preferably 36 to 84.49 parts by weight, even more preferably 39 to 59 parts by weight, (B) the second acrylate derivative is preferably 0.1 to 50 parts by weight, more preferably 1 to 40 parts by weight; more specifically, (1) the low-molecular-weight derivative having a molecular weight of less than 1000 is 0.1 to 10 parts by weight, (2) the middle-molecular-weight derivative having a molecular weight of 1,000 to 4,000 is 0.5 to 20 parts by weight, and (3) the high-molecular-weight derivative having a molecular weight of 4,000 or more is 1 to 50 parts by weight (more preferably 10 to 40 parts by weight), and (C) the acrylate derivative polymer is preferably 10 to 80 parts by weight, more preferably 15 to 60 parts by weight, even more preferably 15 to 40 parts by weight.

When the amount of the component (A) is less than 14 parts by weight, there are cases where viscosity is increased, handleability is deteriorated, bubbles are hardly removed, and bubbles are easily entrained during coating. On the other hand, when the amount of the component (A) is higher than 89.49 parts by weight, there are cases where viscosity is decreased, dripping occurs, necessary film thickness cannot be secured, curing shrinkage is increased, smoothness is deteriorated upon formation into a sheet, and distortion easily remains upon direct coating and curing on a panel.

When the amount of the component (B) is less than 0.1 part by weight, a cured product of the resin composition may hardly maintain its shape, on the other hand, when the amount of the component (B) is higher than 50 parts by weight, a cured product of the resin composition may become brittle to cause a problem in mechanical characteristics.

When the amount of the component (C) is less than 10% by weight, there are cases where curing shrinkage is increased, smoothness is deteriorated upon formation into a sheet, and distortion easily remains upon direct coating and curing on a panel. On the other hand, when the amount of the component (C) is higher than 80 parts by weight, there are cases where viscosity is increased, bubbles are hardly removed, and bubbles are easily entrained during coating.

[(D) Polymerization Initiator]

When the optical resin composition of the present invention is subjected to curing reaction, the optical resin composition preferably further contains (D) a polymerization initiator, wherein the amount of the component (D), based on 100 parts by weight of (A) the first acrylate derivative, (B) the second acrylate derivative, (C) the acrylate derivative polymer, and (D) the polymerization initiator in total, is preferably 0.01 to 5 parts by weight, more preferably 0.01 to 3 parts by weight, even more preferably 0.03 to 2 parts by weight. When the amount of the polymerization initiator is less than 0.01 part by weight, the reaction does not sufficiently proceed, on the other hand, when the amount of the polymerization initiator is higher than 5 parts by weight, the polymerization initiator will remain in a large amount to cause a problem in optical characteristics or mechanical characteristics.

As (D) the polymerization initiator, it is possible to use (D1) a photopolymerization initiator and/or (D2) a thermopolymerization initiator. When (D1) the photopolymerization initiator is used as (D) the polymerization initiator in the above composition, its use amount is preferably 0.1 to 5 parts by weight. When the thermopolymerization initiator is used as the polymerization initiator, its use amount is preferably 0.01 to 1 part by weight. When both the photopolymerization initiator and the thermopolymerization initiator are simultaneously used, they are used preferably in their respective amount ranges.

In the above composition, the high-molecular-weight crosslinking agent when used as (B) the second acrylate derivative is used preferably in an amount 1 part by weight or more, and the second acrylate derivatives having low-molecular weights to middle-molecular weights (particularly low-molecular-weight monomers etc.) are used preferably in an amount 10 parts by weight or less.

In the case of polymerization by irradiation with an electron beam, the polymerization initiator may not be used. That is, the curing reaction may be a curing reaction by irradiation with an active energy ray, or a curing reaction by heat, or both of them. The active energy ray refers to ultraviolet ray, electron beam, α-ray, β-ray, γ-ray, and the like. These methods can also be applied to synthesis of the acrylate derivative polymer.

In the present invention, (D1) the photopolymerization initiator can be selected from known materials such as benzophenone materials, anthraquinone materials, benzoin materials, sulfonium salts, diazonium salts, and onium salts. These materials have sensitivity particularly to ultraviolet ray.

Specific examples of the photopolymerization initiator include aromatic ketone compounds such as benzophenone, N,N'-tetramethyl-4,4'-diaminobenzophenone (Michler's ketone), N,N'-tetraethyl-4,4'-diaminobenzophenone, 4-methoxy-4'-dimethylaminobenzophenone, α-hydroxyisobutylphenone, 2-ethylanthraquinone, t-butylanthraquinone, 1,4-dimethylanthraquinone, 1-chloroanthraquinone, 2,3-dichloroanthraquinone, 3-chloro-2-methylanthraquinone, 1,2-benzoanthraquinone, 2-phenylanthraquinone, 1,4-naphthoquinone, 9,10-phenanthraquinone, thioxanthone, 2-chlorothioxanthone, 1-hydroxycyclohexyl phenyl ketone, 2,2-dimethoxy-1,2-diphenylethan-1-one, and 2-hydroxy-2-methyl-1-phenylpropan-1-one, benzoin compounds such as benzoin, methyl benzoin and ethyl benzoin, benzoin ether compounds such as benzoin methyl ether, benzoin ethyl ether, benzoin isobutyl ether and benzoin phenyl ether, ester compounds such as benzyl, 2,2-diethoxy acetophenone, benzyl dimethyl ketal and β-(acridin-9-yl)acrylate, acridine compounds such as 9-phenyl acridine, 9-pyridyl acridine and 1,7-diacridinoheptane, 2,4,5-triarylimidazole dimers such as 2-(o-chlorophenyl)-4,5-diphenyl imidazole dimer, 2-(o-chlorophenyl)-4,5-di(m-methoxyphenyl)imidazole dimer, 2-(o-fluorophenyl)-4,5-diphenylimidazole dimer, 2-(o-methoxyphenyl)-4,5-diphenylimidazole dimer, 2-(p-methoxyphenyl)-4,5-diphenylimidazole dimer, 2,4-di(p-methoxyphenyl)-5-phenylimidazole dimer, 2-(2,4-dimethoxyphenyl)-4,5-diphenylimidazole dimer, and 2-(p-methylmercaptophenyl)-4,5-diphenylimidazole dimer, 2-benzyl-2-dimethylamino-1-(4-morpholinophenyl)-1-butanone, 2-methyl-1-[4-(methylthio)phenyl]-2-morpholino-1-propane, bis(2,4,6-trimethylbenzoyl)-phenylphosphine oxide, oligo(2-hydroxy-2-methyl-1-(4-(1-methylvinyl)phenyl)propanone), and the like. Preferable examples of the photopolymerization initiator causing no coloration of the resin composition include α-hydroxyalkyl phenone compounds such as 1-hydroxycyclohexyl phenyl ketone, 2-hydroxy-2-methyl-1-phenyl-propan-1-one, and 1-[4-(2-hydroxyethoxy)-phenyl]-2-hydroxy-2-methyl-1-propan-1-one, acyl phosphine oxide compounds such as bis(2,4,6-trimethylbenzoyl)-phenylphosphine oxide, bis(2,6-dimethoxybenzoyl)-2,4,4-trimethyl-pentylphoshine oxide, and 2,4,6-trimethylbenzoyl-diphenylphosphine oxide, and mixtures of oligo(2-hydroxy-2-methyl-1-(4-(1-methylvinyl)phenyl)propanone), oxy-phenyl-acetic acid 2-[2-oxo-2-phenyl-acetoxy-ethoxy]-ethyl ester and oxy-phenyl-acetic acid 2-[2-hydroxy-ethoxy]-ethyl ester, and combinations thereof. Photopolymerization initiators that are preferably used in preparation of particularly a thick sheet are those including acyl phosphine oxide compounds such as bis(2,4,6-trimethylbenzoyl)-phenylphosphine oxide, bis(2,6-dimethoxybenzoyl)-2,4,4-trimethyl-pentylphoshine oxide, and 2,4,6-trimethylbenzoyl-diphenylphosphine oxide. For reducing the smell of a sheet, the photopolymerization initiators are preferably mixtures of oligo(2-hydroxy-2-methyl-1-(4-(1-methylvinyl)phenyl)propanone), oxy-phenyl-acetic acid 2-[2-oxo-2-phenyl-acetoxy-ethoxy]-ethyl ester and oxy-phenyl-acetic acid 2-[2-hydroxy-ethoxy]-ethyl ester. For reducing polymerization inhibition by oxygen, the photopolymerization initiators are preferably mixtures of oxy-phenyl-acetic acid 2-[2-oxo-2-phenyl-acetoxy-ethoxy]-ethyl ester and oxy-phenyl-acetic acid 2-[2-hydroxy-ethoxy]-ethyl ester. These photopolymerization initiators may also be used in combination thereof.

(D2) The thermopolymerization initiator is an initiator that generates a radical by heating, and specific examples include organic peroxides such as benzoyl peroxide, t-butyl perbenzoate, cumene hydroperoxide, diisopropylperoxy dicarbonate, di-n-propylperoxy dicarbonate, di(2-ethoxyethyl)peroxy dicarbonate, t-butylperoxy neodecanoate, t-butylperoxy pivalate, t-hexylperoxy pivalate, (3,5,5-trimethylhexanoyl)peroxide, dipropionyl peroxide, lauroyl peroxide, diacetyl peroxide and didodecyl peroxide. Other examples include azo compounds such as 2,2'-azobisisobutyronitrile, 2,2'-azobis (2-methylbutyronitrile), 1,1'-azobis(cyclohexane-1-carbonyl), 2,2'-azobis(2,4-dimethylvaleronitrile), 2,2'-azobis(2,4-dimethyl-4-methoxyvaleronitrile), dimethyl 2,2'-azobis(2-methylpropionate), 4,4'-azobis(4-cyanovaleric acid), 2,2'-azobis(2-hydroxymethylpropionitrile), and 2,2'-azobis[2-(2-imidazolin-2-yl)propane].

When the temperature at which half of the thermopolymerization initiator is decomposed in 10 hours, called 10-hour half-life temperature, is too low, storage stability may be reduced, while when the 10-hour half-life temperature is too high, there may arise a problem that because heating at high temperature is necessary for the reaction, the characteristics of a liquid crystal or a polarization plate are deteriorated, so the display characteristics of the liquid crystal display are deteriorated. Accordingly, the 10-hour half-life temperature of the thermopolymerization initiator is preferably 40 to 80° C., more preferably 40 to 65° C., even more preferably 50 to 65° C. A thermopolymerization initiator having a relatively high 10-hour half-life temperature can easily secure storage stability, but should be added in a relatively large amount because of its low reactivity. On the other hand, a thermopolymerization initiator having a low 10-hour half-life temperature is added preferably in a relatively small amount to prevent polymerization reaction during storage.

The heating of the optical resin composition when applied or injected in the state of a resin composition may not be allowable because of the low heat resistance of a polarization plate used in a liquid crystal panel. In this case, a photopolymerization initiator capable of polymerization with light is preferable. In this case, the amounts of the respective components, based on 100 parts by weight of (A) the acrylate derivative, (B) the acrylate derivative polymer, (C) the high-molecular-weight crosslinking agent and preferably (D1) the photopolymerization initiator in total, are (A) 15 to 40 parts by weight, (B) 5 to 40 parts by weight, (C) 39 to 59 parts by weight and (D1) 0.5 to 2.0 parts by weight.

In the optical resin composition of the present invention, (A) the first acrylate derivative is preferably a mixture consisting of an alkyl acrylate having an alkyl group containing 4 to 18 carbons (referred to hereinafter as AA monomer) and a hydroxyl-containing acrylate represented by the following general formula (I) (referred to hereinafter as HA monomer):

$$CH_2=CHCOO(C_mH_{2m}O)_nH \qquad \text{General Formula (I)}$$

wherein m is 2, 3 or 4, and n is an integer of 1 to 10.

(C) The acrylate derivative polymer is preferably a copolymer obtained by polymerizing AA monomer with HA monomer.

The HA monomer is incorporated preferably such that the proportion (M % by mass) of HA monomer in (A) the first acrylate derivative and the proportion (P % by mass) of HA monomer in (C) the acrylate derivative polymer satisfy the following relationship:

$$-8 \leq (P-M) \leq 8 \qquad \text{Formula (I)}$$

In this case, the preferable amounts of the respective components in the optical resin composition of the present invention, based on 100 parts by weight of (A) the first acrylate derivative, (B) the second acrylate derivative and (C) the acrylate derivative polymer in total, are as follows: (A) the first acrylate derivative is contained in an amount of preferably 36 to 84.49 parts by weight, more preferably 39 to 69 parts by weight, even more preferably 39 to 59 parts by weight, (B) the second acrylate derivative is contained in an amount of preferably 0.1 to 50 parts by weight, more preferably 0.5 to 50 parts by weight, even more preferably 1 to 40 parts by weight, and (C) the acrylate derivative polymer is contained in an amount of preferably 15 to 60 parts by weight, more preferably 15 to 40 parts by weight, even more preferably 40 to 60 parts by weight. As (B) the second acrylate derivative, more specifically, (1) the low-molecular-weight derivative having a molecular weight of less than 1000 is preferably contained in an amount of 0.1 to 10 parts by weight, (2) the middle-molecular-weight derivative having a molecular weight of 1,000 to 4,000 in an amount of 0.5 to 20 parts by weight, and (3) the high-molecular-weight derivative having a molecular weight of 4,000 or more in an amount of 1 to 50 parts by weight (more preferably 10 to 40 parts by weight).

When (D) the polymerization initiator is further contained, (D) the polymerization initiator based on 100 parts by weight of the components ((A) to (C)) and (D) the polymerization initiator in total in the resin composition is contained in an amount of preferably 0.01 to 5 parts by weight, more preferably 0.01 to 3 parts by weight, even more preferably 0.03 to 2 parts by weight ((D1) the photopolymerization initiator is contained in an amount of preferably 0.1 to 5 parts by weight, more preferably 0.3 to 3 parts by weight, even more preferably 0.5 to 2.0 parts by weight, and (D2) the thermopolymerization initiator is contained in an amount of preferably 0.01 to 1 part by weight, more preferably 0.01 to 0.5 part by weight, and when both (D1) the photopolymerization initiator and (D2) the thermopolymerization initiator are used, they are used preferably in their respective ranges).

In the above composition, the high-molecular-weight crosslinking agent when used as (B) the second acrylate derivative is used in an amount of 1 part by weight or more, more preferably 5 parts by weight or more, and the amount of the low-molecular weight to middle-molecular weight second acrylate derivatives (particularly the low-molecular-weight monomer etc.) is preferably 10 parts by weight or less.

(A) The first acrylate derivative is preferably a compound having one acryloyl group in its molecule, and this compound is preferably a mixture of AA monomer and HA monomer, more preferably used in a proportion of 50 to 87% by weight of AA monomer and 13 to 50% by weight of HA monomer, even more preferably used in a proportion of 60 to 70% by weight of AA monomer and 30 to 40% by weight of HA monomer.

When the amount of AA monomer is higher than 87% by weight and thus the amount of HA monomer is too small, a cured product upon moisture absorption becomes easily clouded, on the other hand, when the amount of HA monomer is higher than 50% by weight and thus the amount of AA monomer is too small, a cured product of the optical resin composition of the present invention upon moisture absorption is easily deformed.

The HA monomer is preferably incorporated such that the proportion (M % by mass) of HA monomer in (A) the first acrylate derivative and the proportion (P % by mass) of HA monomer in (C) the acrylate derivative polymer satisfy the following relationship:

$$-8 \leq (P-M) \leq 8 \quad \text{Formula (I)}$$

When (P–M) does not satisfy the above relationship, the optical resin material of the present invention tends to be easily clouded upon curing. This condition is always satisfied when AA monomer (and HA monomer) are in the preferable proportions described above in (C) the acrylate derivative polymer and (A) the first acrylate derivative.

The value of (P–M) preferably has a lower limit of –5 and an upper limit of 5, more preferably a lower limit of –3 and an upper limit of 3.

The AA monomer includes n-butyl acrylate, n-pentyl acrylate, n-hexyl acrylate, n-octyl acrylate, isooctyl acrylate, 2-ethylhexyl acrylate, dodecyl acrylate, stearyl acrylate, and the like, among which n-butyl acrylate, isooctyl acrylate, 2-ethylhexyl acrylate and n-octyl acrylate are preferable, and ethylhexyl acrylate is particularly preferable. These acrylates may be used as a combination of two or more thereof.

The HA monomer includes hydroxyl-containing acrylates such as 2-hydroxyethyl acrylate, 1-hydroxyethyl acrylate, 2-hydroxypropyl acrylate, 3-hydroxypropyl acrylate, 1-hydroxypropyl acrylate, 4-hydroxybutyl acrylate, 3-hydroxybutyl acrylate, 2-hydroxybutyl acrylate and 1-hydroxybutyl acrylate, polyethylene glycol monoacrylates such as diethylene glycol or triethylene glycol, polypropylene glycol monoacrylates such as dipropylene glycol or tripropylene glycol, and polybutylene glycol monoacrylates such as dibutylene glycol or tributylene glycol, among which 2-hydroxyethyl acrylate, 1-hydroxyethyl acrylate, 2-hydroxypropyl acrylate, 3-hydroxypropyl acrylate, 1-hydroxypropyl acrylate, 4-hydroxybutyl acrylate, 3-hydroxybutyl acrylate, 2-hydroxybutyl acrylate and 1-hydroxybutyl acrylate are preferable, and 2-hydroxyethyl acrylate is particularly preferable. These acrylates may be used as a combination of two or more thereof.

In the present invention, the AA monomer and HA monomer are used preferably as the same combination in (A) the first acrylate derivative and (C) the acrylate derivative polymer, respectively.

The copolymer obtained by polymerizing the AA monomer with the HA monomer in the present invention has a weight-average molecular weight (determined by using a calibration curve of standard polystyrenes by gel permeation chromatography; this applies hereinafter) of preferably 100,000 to 700,000, more preferably 150,000 to 400,000, still more preferably 200,000 to 350,000.

As the method of synthesizing the copolymer obtained by polymerizing the AA monomer with the HA monomer, it is possible to use known polymerization methods, such as solution polymerization, suspension polymerization, emulsion polymerization and bulk polymerization, among which solution polymerization or bulk polymerization is preferable. As the polymerization initiator, a compound generating a radical by heat can be used. Specific examples include organic peroxides such as benzoyl peroxide, t-butyl perbenzoate, cumene hydroperoxide, diisopropylperoxy dicarbonate, di-n-propylperoxy dicarbonate, di(2-ethoxyethyl)peroxy dicarbonate, t-butylperoxy neodecanoate, t-butylperoxy pivalate, (3,5,5-trimethylhexanoyl)peroxide, dipropionyl peroxide, diacetyl peroxide and didodecyl peroxide, and azo compounds such as 2,2'-azobisisobutyronitrile, 2,2'-azobis(2-methylbutyronitrile), 1,1'-azobis(cyclohexane-1-carbonyl), 2,2'-azobis(2,4-dimethylvaleronitrile), 2,2'-azobis(2,4-dimethyl-4-methoxyvaleronitrile), dimethyl 2,2'-azobis(2-methylpropionate), 4,4'-azobis(4-cyanovaleric acid), 2,2'-azobis (2-hydroxymethylpropionitrile), and 2,2'-azobis[2-(2-imidazolin-2-yl)propane].

The polymerization of the AA monomer at a proportion of 50 to 87% by weight with the HA monomer at 13 to 50% by weight is preferable, and the polymerization of the AA monomer at 60 to 70% by weight with the HA monomer at 30 to 40% by weight is more preferable.

From the viewpoint of deterioration prevention, thermal stability, moldability and processability, the optical resin composition of the present invention may be compounded with antioxidants based on phenol, phosphite, and thioether, release agents such as aliphatic alcohols, fatty acid esters, phthalates, triglycerides, fluorochemical surfactants, and higher fatty metal salts, other lubricants, plasticizers, antistatic agents, ultraviolet absorbers, flame retardants, heavy-metal deactivators, fine granular fillers such as alumina, silica, magnesium oxide, talc, barium titanate, and barium sulfate, and coloring agents including dyes such as Victoria Pure Blue and pigments such as phthalocyanine green, in such a range that optical characteristics or the working effect of the present invention is not significantly deteriorated. Also, compounds having one polymerizable unsaturated bond in its molecule, such as acrylonitrile, styrene, vinyl acetate, ethylene, and propylene may also be used as components other than the components (A) to (D).

Preferably the optical resin composition of the present invention is further added with various stabilizers as necessary. The stabilizers include polymerization inhibitors such as paramethoxy phenol used for the purpose of improving the storage stability of the resin composition, antioxidants such as triphenyl phosphine used in improving the heat resistance of a cured product of the resin composition, and HALS etc. used for improving weatherability. These stabilizers may be used as a combination of one or more thereof. Besides, other compounds may be added in such a range that the effect of the present invention can be attained.

The curing shrinkage of the optical resin composition of the present invention is preferably 15% or less, more preferably 12% or less. When the curing shrinkage is high, stress by shrinkage is increased thus generating distortion in the resin or causing the resin to be easily released from a protective plate or a liquid crystal panel.

The optical resin composition of the present invention is formed into a film or a layer on an optical filter or on the surface of an image display panel of an image display device, such that its film thickness preferably reaches 0.1 mm to 3 mm. In consideration of impact absorption, the thickness is more preferably 0.2 mm or more. Particularly when impact absorption is to be increased, the thickness is preferably 1.3 mm or more. The optical resin composition of the present invention can be applied onto the surface of an image display panel or an image display device, a substrate of an optical filter, or the like, may be applied to form a film thereon, then cured by irradiation with a light such as ultraviolet ray or a radiation such as electron beam, to form an optical resin material. When an optical filter is prepared, the optical resin composition of the present invention is formed into a film on a substrate of the optical filter or on a functional layer such as an antireflective film, further laminated with a substrate of the optical filter, a functional layer or a protective layer, and then cured by irradiation with a radiation. The optical resin composition of the present invention may, when possible, be used in the form of a sheet (including form of a film).

<Optical Resin Material>

The optical resin material of the present invention can be obtained by curing reaction of the optical resin composition of the present invention. The optical resin composition may be applied to form a film on the surface of an image display panel or an image display device, on a substrate of an optical film, or the like, and then cured by irradiation with light or by heating to a predetermined temperature. Heating and light irradiation may be simultaneously used.

As the method of synthesizing the acrylate derivative polymer, it is possible to use known polymerization methods, such as solution polymerization, suspension polymerization, emulsion polymerization and bulk polymerization.

The produce of the optical resin material of the present invention can make use of injection molding for example, by applying the resin composition to a desired thickness with a general-purpose coater and then curing it by irradiation with a light such as ultraviolet ray or a radiation such as electron beam. When the material is in the form of a sheet (including in form of a film), the thickness of the sheet is preferably 0.1 mm to 3 mm. When a transparent protective substrate is not used, the thickness of the sheet is more preferably 0.2 mm or more in consideration of impact absorption. Particularly when impact absorption is to be increased, the thickness is preferably 1.3 mm or more. On the other hand, when a transparent protective substrate is used, the thickness of the sheet is preferably 0.5 mm or less, more preferably 0.2 mm or less. This optical resin material can be laminated in the form of a sheet (including a film) such as on the surface of an image display panel or an image display device or on an optical filter, directly or via a pressure-sensitive adhesive or an adhesive.

When an optical filter is to be produced, the optical resin composition of the present invention can be applied onto a substrate of an optical filter or a functional layer such as an antireflective film layer to form a film thereon, then laminated with a substrate of an optical filter, a functional layer or a protective layer and then cured by irradiation with a radiation. The optical resin composition of the present invention may, when possible, be used in the form of a sheet (including the form of a film) and then cured.

The glass transition temperature (Tg) of the optical resin material used in the present invention is preferably 0° C. or less. When the glass transition temperature is higher than 0° C., the impact-absorbing layer is made rigid and easily ruptured by impact. The Tg is more preferably −20 to −60° C.

In the molecule of the polymer serving as the optical resin material used in the present invention is preferably provided with a polar group for the purpose of increasing adhesiveness. The polar group for increasing adhesiveness to glass includes polar groups such as a hydroxyl group, a carboxyl group, a cyano group and a glycidyl group, and these groups can be introduced by reacting the molecule with a monomer having such a group.

The rubber hardness of the optical resin material of the present invention is preferably 50 or less.

A sample of 40 mm in width, 40 mm in length and 10 mm in depth is measured for its rubber hardness and used at 5 positions with a spring-type hardness meter (for example, WR-104A manufactured by Nishi Tokyo Seimitsu Co., Ltd.), and an average value at the 5 positions is indicated as rubber hardness.

The storage elastic modulus of the optical resin material of the present invention is preferably $10^4$ to $10^7$ Pa at 25° C. in order to support a protective plate and to absorb impact.

The birefringence of the optical resin material of the present invention is preferably 30 nm or less, more preferably 10 nm or less. When the birefringence is large, irregular color tends to easily occur upon lighting of a liquid crystal panel.

The optical resin composition and the optical resin material according to the present invention, when used in image display devices, have a visible light transmittance of preferably 50% or more, more preferably 80% or more, even more preferably 85% or more. When the total light transmittance is too low, contrast tends to decrease and visibility tends to decrease.

When the polymerization of the optical resin composition of the present invention by irradiation with ultraviolet ray or the like is inhibited by the presence of oxygen, the surface of the resin is preferably covered with a transparent film or transparent glass to shield oxygen. By polymerization in an inert atmosphere, oxygen can also be shielded. When oxygen is difficult to shield, the influence of oxygen on polymerization inhibition can be reduced by increasing the amount of a polymerization initiator added. The polymerization initiator in this case is preferably a mixture of oxy-phenyl-acetic acid 2-[2-oxo-2-phenyl-acetoxy-ethoxy]-ethyl ester and oxy-phenyl-acetic acid 2-[2-hydroxy-ethoxy]-ethyl ester. An ultraviolet irradiator that can be used includes sheet-feeding or conveyor-type ultraviolet irradiators. A light source that can be used in ultraviolet irradiation includes a low-pressure mercury lamp, a medium-pressure mercury lamp, a high-pressure mercury lamp, a metal halide lamp and a LED lamp, among which a high-pressure mercury lamp and a metal halide lamp are preferable.

Even if the optical resin composition of the present invention is formed into a thick film or the optical resin material of the present invention is thick, it includes a high-molecular-weight copolymer (component (C)), and thus the optical resin material as its cured resin is rigid, is hardly composition deformable against impact, and can thus be made thicker to easily improve impact absorption.

The optical resin composition or the optical resin material according to the present invention can be applied to various image display devices. The image display devices include plasma display panel (PDP), liquid crystal display (LCD), cathode ray tube (CRT), field emission display (FED), organic EL display, electronic paper, and the like.

<Optical Filter>

The optical filter of the present invention can be constituted by combining the optical resin composition or the optical resin material of the present invention with a multilayer material having a functional layer such as an antireflective layer, an antifouling layer, a coloring layer, a hard coat layer, or the like, formed as a film or layer on a substrate film such as a polyethylene film or a polyester film, or with a plate such as glass, acrylate or polycarbonate, or with a multilayer material having a functional layer formed as a film or layer on such a plate, or with such a plate or multilayer material.

The antireflective layer may be a layer having an antireflection property to reduce the visible reflectance of the optical filter to 5% or less, and may be a layer treating a transparent substrate such as a transparent plastic film by an known antireflection method.

The antifouling layer is used to make the surface of the optical filter antifouling, and a layer of a fluorine-based resin, a silicon-based resin, or the like, is used to decrease surface tension, and these known layers can be used.

The coloring layer is used for improving color purity and used in reducing unnecessary light when the color purity of light emitted from an image display panel such as a liquid crystal display panel. A coloring matter that absorbs an unnecessary portion of light is dissolved in a resin and formed into a film or layer on a substrate film such as a polyethylene film or a polyester film or is mixed with a pressure-sensitive adhesive.

The hard coat layer is used to increase surface hardness. As the hard coat layer, acrylic resin such as urethane acrylate or epoxy acrylate, epoxy resin, or the like, can be formed into a film or layer on a substrate film such as polyethylene film. Similarly, a glass plate, an acrylic plate, a plate of polycarbonate, or the like, or a hard coat layer formed into a film or laminated on such a plate can also be used to increase surface hardness.

In the optical resin composition or the optical resin material of the present invention, a functional layer such as an antireflective layer and an appropriately necessary layer can used by lamination. In this case, the functional layer may be laminated on one side of a transparent substrate, or layers different in function or layers having the same function may be laminated on both sides of a transparent substrate. The functional layers may be arranged in an arbitrary order.

The optical resin composition or optical resin material of the present invention, when combined with these functional layers, is laminated preferably in a side near to an image display panel or the surface of an image display device.

The optical filter of the present invention can also be obtained by laminating the optical resin composition or optical resin material of the present invention on a polarization plate. In this case, the optical resin composition or material may be formed into a film or layer at the viewable side, or the other side, of a polarization plate. When the optical resin composition or optical resin material of the present invention is used at the viewable side of a polarization plate, an antireflective layer, an antifouling layer and a hard coat layer may be laminated nearer to the viewable face than the optical resin composition or material. When the optical resin composition or material is used between a polarization plate and a liquid crystal cell, functional layers can be laminated at the viewable side of the polarization plate.

When such a multilayer material is formed, the optical resin composition or optical resin material of the present invention is arranged preferably as the outermost layer.

If necessary, these layers may be laminated via pressure-sensitive adhesive layers among the layers by a roller laminator or a sheet feeding laminator. The multilayer material laminated by a roller laminator or a sheet feeding laminator can be laminated by a roller laminator or a sheet feeding laminator on an image display panel or in front of an image display device or on a front plate or a transparent protective substrate for an image display device.

<Image Display Device>

In the image display device of the present invention, a layer consisting of the optical resin composition or optical resin material of the present invention is arranged in a suitable position at the viewable side. Particularly it is applied between an image display panel and a front plate or a transparent protective substrate, is particularly preferred.

The front plate or transparent protective substrate for an image display device can use a general optical transparent substrate. Specific examples include an inorganic plate such as a glass plate or a quartz plate, a resin plate such as an acrylic resin plate, a cycloolefin resin plate or a polycarbonate plate, and a resin sheet such as a thick polyester sheet. When high surface hardness is necessary, a plate such as a glass plate or an acrylic plate is preferable, and a glass plate is more preferable. The front plate or the surface of the transparent protective substrate may have been subjected thereon to antireflection treatment and antifouling treatment or provided with a hard coat. One side or both sides of the front plate or the transparent protective substrate may have been subjected to these surface treatments. A combination of these front plates or transparent protective substrates may also be used.

The front plate or transparent protective substrate for an image display device preferably has a pencil hardness of H or more and a birefringence of 50 nm or less. When the pencil hardness is low, the surface may be scarred or easily ruptured by impact. When the birefringence is high, irregular color tends to easily occur. When the optical resin composition is a ultraviolet curable resin composition, the front plate or transparent protective substrate for an image display device preferably has a ultraviolet transmittance of 1% or more at a wavelength of 365 nm. When the ultraviolet transmittance is low, the ultraviolet curable resin composition becomes easily deficient in curing and reduces reliability.

When the image display device of the present invention is a liquid crystal display, its liquid crystal display cell may use a general liquid crystal display cell. The liquid crystal display cell can be divided, depending on the control method, into TN, STN, VA, IPS etc., and liquid crystal display cells using any of the control methods may be used.

The liquid crystal display will be described in detail by reference to the drawings. FIGS. 1, 2, 3 and 4 are schematic cross-sectional views of liquid crystal displays using the optical resin material of the present invention, and FIGS. 5 and 6 are schematic cross-sectional views of conventional liquid crystal displays.

Figure 5:
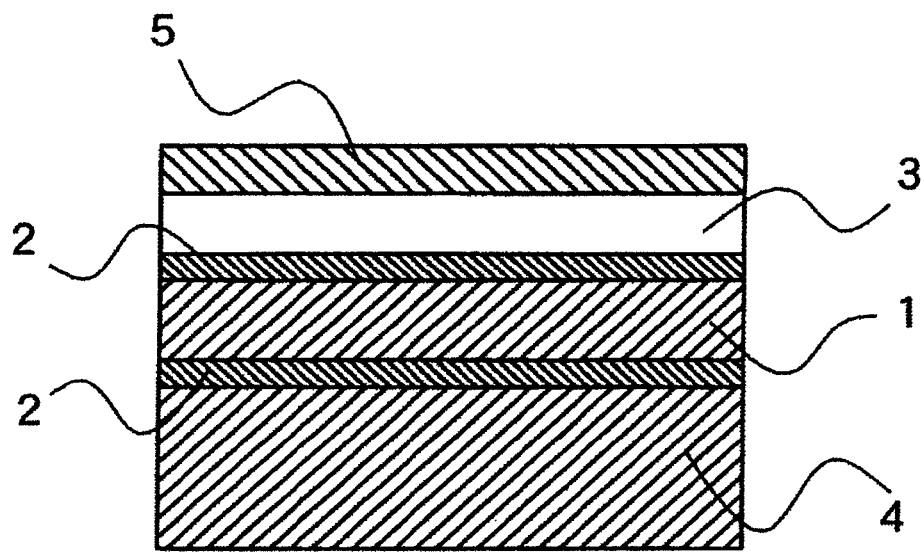
FIG. 5 is a schematic cross-sectional view showing a conventional liquid crystal display.
Figure 6:
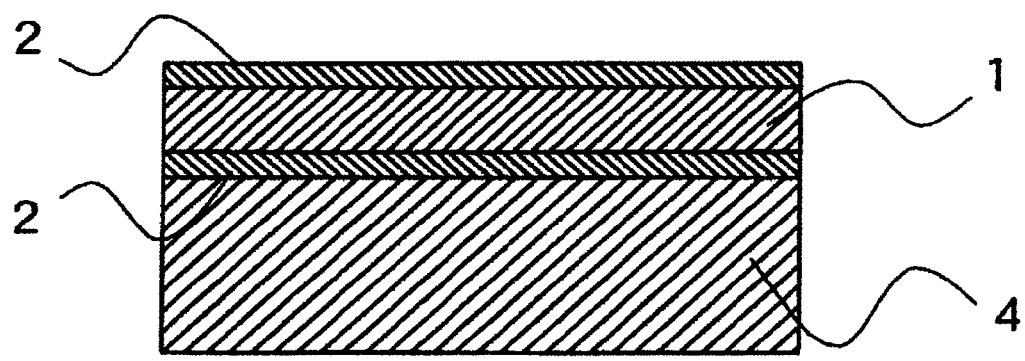
FIG. 6 is a schematic cross-sectional view showing another example of the conventional liquid crystal display.

The structure of the conventional liquid crystal display as shown in one example in FIG. 5 is composed of a liquid crystal display cell 1, polarization plates 2 stuck to both sides thereof, and a transparent protective substrate 5 arranged via gap 3 in the front. The liquid crystal display cell 1 is a structure having a liquid crystal encapsulated between two transparent glass plates, and polarization plates 2 etc. are attached outside of the glass plates on both sides. Reference numeral 4 positioned below the liquid crystal display cell 1 is a reflective plate or a backlight system. In this case, an antireflective layer, an antifouling layer, a hard coat layer and the like are laminated as necessary in front of the transparent protective substrate 5. FIG. 6 shows another conventional liquid crystal display, which includes a liquid crystal display cell 1, polarization plates 2 stuck to both sides thereof, and a reflective plate or a backlight unit 4. In this case, an antireflective layer, an antifouling layer, a hard coat layer and the like are laminated as necessary in front of the polarization plate 2. On the other hand, a liquid crystal display composed by using a transparent resin layer consisting of the optical resin material of the present invention is shown in FIG. 1 as one example of the liquid crystal display of the present invention.

Polarization plates 2 are laminated on both sides of the liquid crystal display cell 1, a transparent resin layer 3' is laminated on one of the polarization plates 2, and a transparent protective substrate 5 is laminated thereon to constitute a viewable side, while a reflective plate or a backlight system 4 is arranged on the other polarization plate 2.

Figure 2:
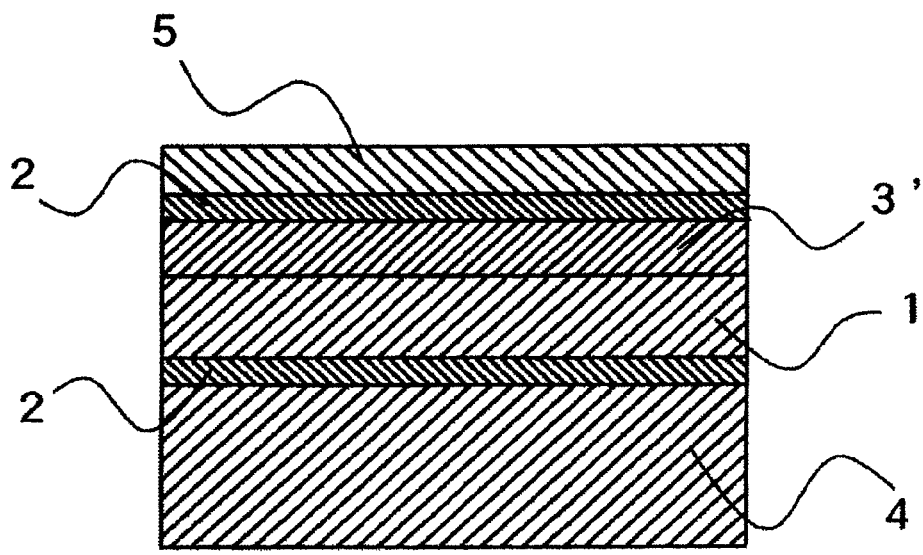
FIG. 2 is a schematic cross-sectional view showing another example of a liquid crystal display using the optical resin material of the present invention.

The order of the transparent resin layer 3' and the polarization plate 2 at the viewable side in the structure shown in FIG. 1 may be changed as shown in FIG. 2. In this case, a pressure-sensitive adhesive or the like may be used to stick the polarization plate 2 to the transparent protective substrate 5. When the transparent protective substrate 5 is used as shown in FIG. 1 or 2, the surface of the transparent protective substrate 5 may be laminated thereon as necessary with an antireflective layer, an antifouling layer, a hard coat layer and the like. The surface of the polarization plate 2 may be laminated thereon as necessary with an antireflective layer, an antifouling layer, a hard coat layer and the like, but these functional layers may be lacking.

Figure 3:
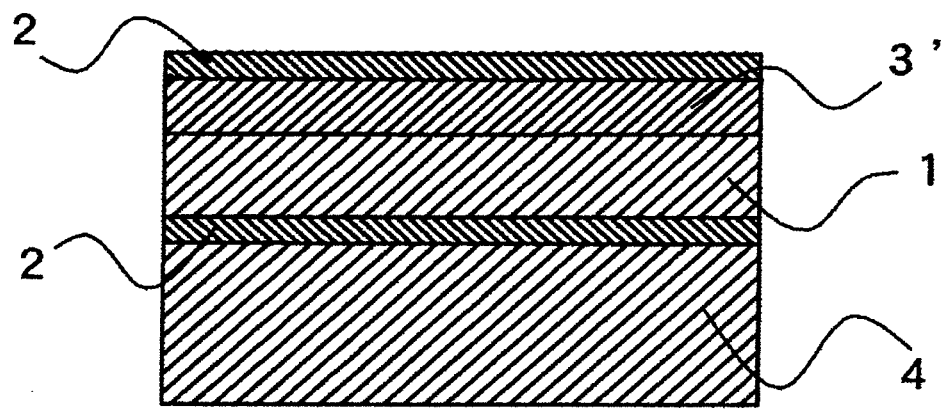
FIG. 3 is a schematic cross-sectional view showing another example of a liquid crystal display using the optical resin material of the present invention.
Figure 4:
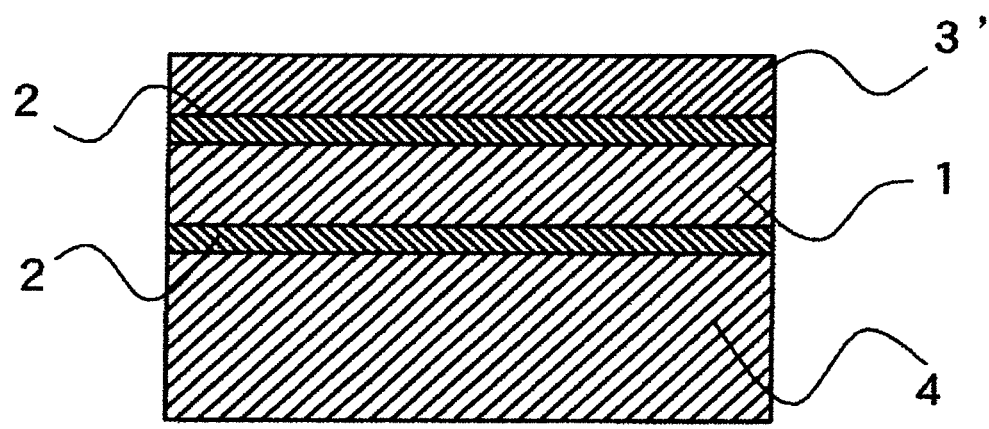
FIG. 4 is a schematic cross-sectional view showing another example of a liquid crystal display using the optical resin material of the present invention.

There are also structures where the transparent protective substrate 5 is not arranged as shown in FIGS. 3 and 4, corresponding to the structures of the liquid crystal displays in FIGS. 1 and 2. In FIG. 4, the order of the transparent resin layer 3' and the polarization plate 2 is changed. When the polarization plate 2 is arranged as the outermost layer as shown in FIG. 3, an antireflective layer, an antifouling layer, a hard coat layer and the like may be laminated on the surface of the polarization plate 2. When the transparent resin layer 3' is arranged as the outermost layer as shown in FIG. 4, an antireflective layer, an antifouling layer, a hard coat layer and the like may be laminated in front of the transparent resin layer 3', and at least a hard coat layer is particularly preferably laminated.

The polarization plate may use a general polarization plate. The surface of the polarization plate may have been subjected to antireflection treatment, antifouling treatment or provided with a hard coat. One side or both sides of the polarization plate may have been subjected to such surface treatments.

The optical resin composition or the optical resin material of the present invention is formed into a film or layer laminated on functional layers such as an antireflective layer, an electromagnetic shielding layer and an infrared shielding layer or on substrate films such as a polyethylene film and a polyester film and can be utilized as a multilayer material or as an optical filter consisting of such multilayer material.

The electromagnetic shielding layer may be a known electromagnetic shielding layer as long as it has a visible reflectance of 60% or more as electromagnetic shielding property. A transparent electroconductive film, an electroconductive fiber mesh, a mesh prepared from electroconductive ink, etc. can be used, but from the viewpoint of high transparency and high electromagnetic shielding property, a metal mesh is most preferable. For preparation of a metal mesh, a transparent substrate such as polyester film and an electroconductive foil such as copper foil or aluminum foil are stuck to each other via an adhesive applied to either or both of them, and then the metal foil is etched by the chemical etching process, to produce the intended metal mesh. At this time, the electroconductive metal foil is preferably using one having a rough surface for securing adhesiveness. The rough surface of the electroconductive metal foil is laminated so as to face the adhesive layer. After the metal mesh is prepared by etching as described above, it is preferable that a resin particularly preferably a resin curable with radiations such as ultraviolet ray, electron beam etc. is applied onto the metal mesh and then cured by irradiation with radiations such as ultraviolet ray, electron beam etc., whereby the adhesive layer to which the rough surface was transferred is made transparent. The resin composition of the present invention can be used as a resin for attaining transparency or as a resin both for transparency and as an impact absorbing layer.

The antireflective layer may be a layer having antireflective property to attain a visible reflectance of 5% or less, and can be a layer prepared by treating a transparent substrate such as a transparent plastic film by a known antireflective method.

The infrared shielding layer consists of a resin layer having an infrared absorber such as an imonium salt or an infrared shielding material dispersed therein, and can be laminated on a transparent substrate such as a transparent plastic film. The optical resin composition or the optical resin sheet of the present invention can be endowed with an ability to shield infrared light by dispersing an infrared absorber such as an imonium salt or an infrared shielding material therein.

The filter having an electromagnetic shielding layer or an infrared shielding layer is suitable for a plasma display.

In the layer having the optical resin composition or the optical resin material according to the present invention and functional layers such as an electromagnetic shielding layer, an antireflective layer and an infrared shielding layer, a layer consisting of the optical resin composition or the optical resin material of the present invention is essential and other necessary layers can be used by lamination. In this case, the functional layer may be laminated on one side of a transparent substrate, or layers different in function or layers having the same function may be laminated on both sides of a transparent substrate. The order of functional layers to be laminated is arbitrary.

When such multilayer material is to be formed, the optical resin composition or the optical resin material of the present invention is arranged preferably as the outermost layer. In this case, the optical resin composition or the optical resin material of the present invention can be stuck, via its adhesion, to a panel, a transparent substrate etc as necessary by the user.

On the other hand, it can be previously laminated on a transparent substrate or the like so that a sticking step to be conducted by the user can be eliminated.

These layers can be laminated via a pressure-sensitive layer among the layers by a roller laminator or a sheet feeding laminator. The multilayer material laminated by a roller laminator or a sheet feeding laminator can be laminated, by a roller laminator or a sheet feeding laminator, on the front of an image display device or an image display panel or on a front plate for an image display device. In this case, a layer consisting of the optical resin material of the present invention is preferably stuck to the front of an image display or an image display panel or on a front plate for an image display device. The image display device or the image display device includes PDP, liquid crystal display (LCD) panel, cathode ray tube (CRT), and the like.

EXAMPLES

Hereinafter, the present invention is described by reference to the Examples. The present invention is not limited to these examples.

Example 1

Synthesis of Acrylate Derivative Polymer

In a reaction container equipped with a condenser, a thermometer, a stirrer, a dropping funnel and a nitrogen inlet tube, 84.0 g of 2-ethylhexyl acrylate (AA monomer), 36.0 g of 2-hydroxyethyl acrylate (HA monomer) and 150.0 g of methyl isobutyl ketone were heated as initial monomers from ordinary temperature to 70° C. over 15 minutes while the atmosphere in the reaction container was replaced with nitrogen at a gas flow rate of 100 ml/min. To this solution kept at this temperature was dropped a solution prepared by dissolving 0.6 g of lauroyl peroxide in 21.0 g of 2-ethylhexyl acrylate and 9.0 g of 2-hydroxyethyl acrylate as additional monomers over 60 minutes, and after completion of dropping, the mixture was further reacted for 2 hours. Subsequently, a 2-ethylhexyl acrylate (AA monomer)/2-hydroxyethyl acrylate (HA monomer) copolymer (weight-average molecular weight of 250,000) was obtained by distilling away the methyl isobutyl ketone.

(Synthesis of High-Molecular-Weight Crosslinking Agent)

Then, 180 g of polypropylene glycol (molecular weight 2,000), 2.33 g of 2-hydroxyethyl acrylate, 0.5 g of p-methoxyphenol as a polymerization inhibitor, and 0.05 g of dibutyltin dilaurate as a catalyst were placed in a reaction container equipped with a condenser, a thermometer, a stirrer, a dropping funnel and an air inlet tube and heated to 70° C. under passage of air, and then 22.2 g of isophorone diisocyanate was uniformly dropped thereto over 2 hours under stirring at 70 to 75° C., to carry out the reaction. When the mixture was reacted for about 5 hours after completion of dropping and then measured by IR, the disappearance of the isocyanate was confirmed, and the reaction was terminated to yield polyurethane acrylate (weight-average molecular weight 16,000) having polypropylene glycol and isophorone diisocyanate as repeating units and having polymerizable unsaturated bonds at both ends.

(Preparation of Optical Resin Composition to Preparation of Transparent Sheet)

| | |
|---|---|
| The above copolymer | 24.88 g |
| 2-Ethylhexyl acrylate (AA monomer) | 27.85 g |
| 2-Hydroxyethyl acrylate (HA monomer) | 11.94 g |
| The above polyurethane acrylate | 34.84 g |
| 1-Hydroxy-cyclohexyl-phenyl-ketone (photopolymerization initiator) | 0.50 g |

The above components were stirred and mixed to prepare (1) an optical resin composition which was then poured into a frame of 100 mm in width, 100 mm in length and 0.5 mm in depth, and the resin composition in a state covered at an upper part with an ultraviolet transmitting glass was irradiated with 2,000 mJ ultraviolet ray from an ultraviolet irradiator to yield a transparent sheet. The curing shrinkage of this resin composition was 5.3%, and the sheet had a total light transmittance of 92% and a birefringence of 0.4 nm. Then, this sheet was stuck to a float glass of 2.8 mm in thickness for shield glass, further stuck to a glass of 0.7 mm in thickness, and subjected to an impact resistance test. As a result, the shield glass was not broken at 0.6 J but broken at 0.75 J. This sheet maintained transparency even after a moisture absorption test. The impact resistance test was carried out in the following manner.

—Impact Resistance Test—

The resin sheet stuck to shield glass was further stuck to a glass of 0.7 mm in thickness equivalent to that used in a liquid crystal panel, and 510 g steel ball was dropped to the side of the shield glass, to evaluate its impact resistance. The steel ball was dropped from the center heights of 5 cm, 8 cm, 10 cm, 12 cm, 15 cm, and thereafter from heights increased by 5 cm increments, and impact resistance was evaluated depending on whether the shield glass was broken or not. The impact strength was calculated from the following equation:

$$\text{Impact strength} = \text{steel ball weight (Kg)} \times \text{height (m)} \times 9.8 \ (m/s^2)$$

For example, when the height is 5 cm, the impact strength is 0.51×0.05×9.8=0.25 J.

The resulting optical resin composition was poured into a frame of 40 mm in width, 40 mm in length and 10 mm in depth, and the composition in a state covered at an upper part with an ultraviolet transmitting glass was irradiated with 9,000 mJ ultraviolet ray from an ultraviolet irradiator, to prepare a sample for rubber hardness measurement, and this sample when measured for its rubber hardness indicated a rubber hardness of 2.

Example 2

| | |
|---|---|
| The copolymer in Example 1 | 39.60 g |
| 2-Ethylhexyl acrylate (AA monomer) | 31.88 g |
| 2-Hydroxyethyl acrylate (HA monomer) | 13.66 g |
| The polyurethane acrylate in Example 1 | 13.86 g |
| 1-Hydroxy-cyclohexyl-phenyl-ketone (photopolymerization initiator) | 1.0 g |

The above components were stirred and mixed to prepare (2) an optical resin composition which was then poured into a frame of 100 mm in width, 100 mm in length and 0.5 mm in depth, and the resin composition in a state covered at an upper part with an ultraviolet transmitting glass was irradiated with 2,000 mJ ultraviolet ray from an ultraviolet irradiator to yield a transparent sheet. The curing shrinkage of this resin composition was 5.9% and the total light transmittance of the sheet was 91%. Then, this sheet was stuck to a float glass of 2.8 mm in thickness for shield glass, further stuck to a glass of 0.7 mm in thickness, and subjected to an impact resistance test in the same manner as in Example 1. As a result, the shield glass was not broken at 0.5 J but broken at 0.75 J. This sheet maintained transparency even after a moisture absorption test.

The resin composition was poured into a frame of 40 mm in width, 40 mm in length and 10 mm in depth, and the resin composition in a state covered at an upper part with an ultraviolet transmitting glass was irradiated with 9,000 mJ ultraviolet ray from an ultraviolet irradiator, to prepare a sample for rubber hardness measurement, and this sample when measured for its rubber hardness indicated a rubber hardness of 0.

Example 3

| | |
|---|---|
| The copolymer in Example 1 | 24.50 g |
| 2-Ethylhexyl acrylate (AA monomer) | 27.44 g |
| 2-Hydroxyethyl acrylate (HA monomer) | 11.76 g |
| The polyurethane acrylate in Example 1 | 34.30 g |
| A mixture (photopolymerization initiator) of oxy-phenyl-acetic acid 2-[2-oxo-2-phenyl-acetoxy-ethoxy]-ethyl ester and oxy-phenyl-acetic acid 2-[2-hydroxy-ethoxy]-ethyl ester) | 2.00 g |

The above components were stirred and mixed to prepare (3) an optical resin composition which was then poured into a frame of 100 mm in width, 100 mm in length and 0.5 mm in depth, and the resin composition in a state covered at an upper part with an ultraviolet transmitting glass was irradiated with 2,000 mJ ultraviolet ray from an ultraviolet irradiator to yield a transparent sheet. The curing shrinkage of this resin composition was 5.4%, and the sheet had a total light transmittance of 91% and a birefringence of 0.4 nm. Then, this sheet was stuck to a float glass of 2.8 mm in thickness for shield glass, further stuck to a glass of 0.7 mm in thickness, and subjected to an impact resistance test in the same manner as in Example 1. As a result, the shield glass was not broken at 0.5 J but broken at 0.75 J. This sheet maintained transparency even after a moisture absorption test.

The resin composition was poured into a frame of 40 mm in width, 40 mm in length and 10 mm in depth, and the resin composition in a state covered at an upper part with an ultraviolet transmitting glass was irradiated with 9,000 mJ ultraviolet ray from an ultraviolet irradiator, to prepare a sample for rubber hardness measurement, and this sample when measured for its rubber hardness indicated a rubber hardness of 0. Separately, the resin composition was poured into a frame of 100 mm in width, 100 mm in length and 0.5 mm in depth, and the resin composition in a state not covered at an upper part was irradiated with 2,000 mJ ultraviolet ray from an ultraviolet irradiator to yield a transparent sheet.

When examined by touch, there did not occur stringing on the surface.

Example 4

Synthesis of High-Molecular-Weight Crosslinking Agent 520.80 g of polytetramethylene glycol (molecular weight 850), 1.06 g of diethylene glycol, 275.20 g of unsaturated fatty acid hydroxyalkyl ester-modified ε-caprolactone (Plaqucell FA2D, DAICEL CHEMICAL INDUSTRIES, LTD.), 0.5 g of p-methoxyphenol as a polymerization inhibitor, and 0.3 g of dibutyltin dilaurate as a catalyst were placed in a reaction container equipped with a condenser, a thermometer, a stirrer, a dropping funnel and an air inlet tube, and then heated to 70° C. Then, 222 g of isophorone diisocyanate was uniformly dropped thereto over 2 hours under stirring at 70 to 75° C., to carry out the reaction. When the mixture was reacted for about 5 hours after completion of dropping and then measured by IR, the disappearance of the isocyanate was confirmed, and the reaction was terminated to yield polyurethane acrylate having a weight-average molecular weight of 7,000.

(Preparation of Optical Resin Composition to Preparation of Transparent Sheet)

| | |
|---|---|
| The copolymer in Example 1 | 47.00 g |
| 2-Ethylhexyl acrylate (AA monomer) | 33.25 g |
| 2-Hydroxyethyl acrylate (HA monomer) | 14.25 g |
| The above polyurethane acrylate | 5.00 g |
| 1-Hydroxy-cyclohexyl-phenyl-ketone (photopolymerization initiator) | 0.50 g |

The above components were stirred and mixed to prepare (4) an optical resin composition which was then poured into a frame of 100 mm in width, 100 mm in length and 0.5 mm in depth, and the resin composition in a state covered at an upper part with an ultraviolet transmitting glass was irradiated with 2,000 mJ ultraviolet ray from an ultraviolet irradiator to yield a transparent sheet. The curing shrinkage of this resin composition was 5.4%, and the sheet had a total light transmittance of 92% and a birefringence of 0.4 nm. Then, this sheet was stuck to a float glass of 2.8 mm in thickness for shield glass, further stuck to a glass of 0.7 mm in thickness, and subjected to an impact resistance test in the same manner as in Example 1. As a result, the shield glass was not broken at 0.5 J but broken at 0.75 J. This sheet maintained transparency even after a moisture absorption test.

The resin composition was poured into a frame of 40 mm in width, 40 mm in length and 10 mm in depth, and the resin composition in a state covered at an upper part with an ultraviolet transmitting glass was irradiated with 9,000 mJ ultraviolet ray from an ultraviolet irradiator, to prepare a sample for rubber hardness measurement, and this sample when measured for its rubber hardness indicated a rubber hardness of 1.

Example 5

A sheet prepared in the same manner as in Example 1 was stuck to a float glass of 6.0 mm in thickness for shield glass, further stuck to a glass of 0.7 mm in thickness, and subjected to an impact resistance test in the same manner as in Example 1. As a result, the shield glass was not broken at 2.75 J but broken at 3.0 J.

Example 6

A sheet prepared in the same manner as in Example 1 was stuck to a float glass of 1.3 mm in thickness for shield glass, further stuck to a glass of 0.7 mm in thickness, and subjected to an impact resistance test in the same manner as in Example 1. As a result, the shield glass was not broken at 0.4 J but broken at 0.5 J.

Example 7

A strip of 0.5 mm in thickness and 5 mm in width was stuck as a frame to all sides of an AG-treated polarization plate stuck to the surface of a liquid crystal display cell of 32 inches in diagonal length. (1) The same optical resin composition as in Example 1 was poured into the frame, and then its surface was covered with a soda glass of 32 inches in diagonal length and 2.8 mm in thickness on which an antireflective layer had been formed to prevent the inclusion of bubbles. Then, the resin was cured by exposure with an integrated exposure of 2,000 mJ ultraviolet ray from a conveyor ultraviolet irradiator using a metal halide lamp, thereby giving a liquid crystal display cell having an optical resin material and a transparent protective substrate (soda glass). This liquid crystal display cell was set in a body having a backlight unit and a driving circuit to produce a liquid crystal display. This liquid crystal display was free of color change resulting from coloring of the resin material therein and did not show releasing or floating, in the interface, of the optical resin material or the transparent protective substrate. There was no image deterioration due to ghost image, and upon touching the surface, there was no image deterioration attributable to sagging of the panel.

Example 8

A sheet prepared in the same manner as in Example 1 was stuck to the electromagnetic shielding layer side of a substrate film in an electromagnetic shielding film U (TT42-01) A manufactured by Hitachi Chemical Co., Ltd. to prepare an optical filter having electromagnetic shielding property. When this filter was measured for its impact resistance test in the following manner, the glass was not broken with an impact of 0.8 J but broken with an impact of 0.9 J. Breakage of the resin sheet was not observed.
—Impact Resistance Test—
The resin sheet stuck to the electromagnetic shielding film was further stuck to a soda glass of 2.8 mm in thickness, and a steel ball was dropped onto it to evaluate impact resistance. The impact was increased by 0.1 J increments, and the strength of impact just before the glass or the resin sheet had been broken was regarded as impact resistance.

Example 9

A sheet prepared in the same manner as in Example 2 was stuck to the electromagnetic shielding layer side of a substrate film in an electromagnetic shielding film U (TT42-01) A manufactured by Hitachi Chemical Co., Ltd. and subjected to an impact resistance test in the same manner as in Example 8. As a result, the glass was not broken with an impact of 0.9 J but broken with an impact of 1.0 J. Breakage of the resin sheet was not observed.

Example 10

(1) The optical resin composition in Example 1 was applied onto a polyester film, then covered with a cover film, and irradiated with ultraviolet to produce a sheet of 42-inch size. This sheet was laminated by a roller laminator on a transparent resin layer of an electromagnetic shielding film U (TT42-01) A manufactured by Hitachi Chemical Co., Ltd. to prepare an electromagnetic shielding film with an impact-absorbing layer. The substrate polyester film side of the electromagnetic shielding film was further laminated by a roller laminator on an antireflective film having an infrared shielding function or a visible light wavelength selection absorption function (Clearlas NIR-SA, manufactured by SUMITOMO OSAKA CEMENT Co., Ltd.) to manufacture a directly stuck filter for plasma display. This directly stuck filter was stuck by a laminator to a plasma display panel via the adhesion of the impact-absorbing layer, and when an image was displayed, a display excellent in contrast without a ghost image was obtained.

Reference Example 1

Preparation of Optical Resin Composition to Preparation of Transparent Sheet

| | |
|---|---|
| The copolymer in Example 1 | 31.5 g |
| 2-Ethylhexyl acrylate | 26.95 g |
| 2-Hydroxyethyl acrylate | 11.55 g |
| 1,6-Hexanediol diacrylate | 30.00 g |
| 1-Hydroxy-cyclohexyl-phenyl-ketone | 0.50 g |

The above components were stirred and mixed to prepare (5) an optical resin composition which was then poured into a frame of 100 mm in width, 100 mm in length and 0.5 mm in depth, and the resin composition in a state covered at an upper part with an ultraviolet transmitting glass was irradiated with 2,000 mJ ultraviolet ray from an ultraviolet irradiator to yield a transparent sheet. Then, this sheet was stuck to a float glass of 2.8 mm in thickness for shield glass, further stuck to a glass of 0.7 mm in thickness, and subjected to an impact resistance test in the same manner as in Example 1. As a result, the shield glass was broken at 0.25 J. This sheet maintained transparency even after a moisture absorption test.

The resin composition was poured into a frame of 40 mm in width, 40 mm in length and 10 mm in depth, and the resin composition in a state covered at an upper part with an ultraviolet transmitting glass was irradiated with 9,000 mJ ultraviolet ray from an ultraviolet irradiator, to prepare a sample for rubber hardness measurement, and this sample when measured for its rubber hardness indicated a rubber hardness of 75.

From the results in Reference Example 1, it can be seen that when the low-molecular-weight crosslinking agent is used and compounded in a too large amount, the resulting sheet becomes rigid and tends to decrease impact resistance. That is, the amount of the low-molecular-region is preferably 10% by weight or less.

Example 11

Preparation of Optical Resin Composition to Preparation of Transparent Sheet (1) The optical resin composition in Example 1 was poured into a frame of 100 mm in width, 100 mm in length and 1.0 mm in depth, and the resin composition in a state covered at an upper part with an ultraviolet transmitting glass was irradiated with 2,000 mJ ultraviolet ray from an ultraviolet irradiator to yield a transparent sheet. Then, this sheet was stuck to a float glass of 2.8 mm in thickness for shield glass, further stuck to a glass of 0.7 mm in thickness, and subjected to an impact resistance test in the same manner as in Example 1. As a result, the shield glass was not broken at 0.25 J but broken at 0.4 J. From this result, it is estimated that this sheet is practically not problematic, but the sheet when compared with those in the other examples tends to deteriorate impact resistance when the thickness of the transparent sheet is too thick.

Comparative Example 1

When only the glass of 0.7 mm in thickness was examined for impact resistance in the same manner as in Example 1, the glass was broken at 0.25 J.

Example 12

Preparation of Acrylate Derivative Polymer

In a reaction container equipped with a condenser, a thermometer, a stirrer, a dropping funnel and a nitrogen inlet tube, 84.0 g of 2-ethylhexyl acrylate (AA monomer), 36.0 g of 2-hydroxyethyl acrylate (HA monomer) and 150.0 g of methyl isobutyl ketone were heated as initial monomers from ordinary temperature to 70° C. over 15 minutes, while the atmosphere in the reaction container was replaced with nitrogen at a gas flow rate of 100 ml/min. To this solution kept at this temperature was dropped a solution prepared by dissolving 0.6 g of lauroyl peroxide in 21.0 g of 2-ethylhexyl acrylate and 9.0 g of 2-hydroxyethyl acrylate as additional monomers over 60 minutes. After completion of dropping, the mixture was further reacted for 2 hours. Subsequently, a 2-ethylhexyl acrylate/2-hydroxyethyl acrylate copolymer (weight-average molecular weight of 250,000) was obtained by distilling away the methyl isobutyl ketone.

(Preparation of Optical Resin Composition to Preparation of Transparent Sheet)

| | |
|---|---|
| The above copolymer | 44.50 g |
| 2-Ethylhexyl acrylate (AA monomer) | 38.25 g |
| 2-Hydroxyethyl acrylate (HA monomer) | 16.25 g |
| 1,6-Hexanediol diacrylate | 1.00 g |
| 1-Hydroxy-cyclohexyl-phenyl-ketone (photopolymerization initiator) | 0.50 g |

The above components were stirred and mixed to prepare (6) an optical resin composition which was then poured into a frame of 100 mm in width, 100 mm in length and 0.5 mm in depth, and the resin composition in a state covered at an upper part with an ultraviolet transmitting glass was irradiated with 2,000 mJ ultraviolet ray from an ultraviolet irradiator to yield a transparent sheet. The curing shrinkage of this resin composition was 5.5%, and the sheet had a total light transmittance of 92%, a birefringence of 0.5 nm, and a storage elastic modulus of $1.8 \times 10^5$ at 25° C. Then, this sheet was stuck to a float glass of 2.8 mm in thickness for shield glass, further stuck to a glass of 0.7 mm in thickness, and subjected to an impact resistance test in the same manner as in Example 1. As a result, the shield glass was not broken at 0.6 J but broken at 0.75 J.

The resin composition was poured into a frame of 40 mm in width, 40 mm in length and 10 mm in depth, and the composition in a state covered at an upper part with an ultraviolet transmitting glass was irradiated with 9,000 mJ ultraviolet ray from an ultraviolet irradiator, to prepare a sample for rubber hardness measurement, and this sample when measured for its rubber hardness indicated a rubber hardness of 2.

Example 13

| | |
|---|---|
| The copolymer in Example 12 | 42.75 g |
| 2-Ethylhexyl acrylate (AA monomer) | 36.58 g |
| 2-Hydroxyethyl acrylate (HA monomer) | 15.67 g |
| 1,6-Hexanediol diacrylate | 5.00 g |
| 1-Hydroxy-cyclohexyl-phenyl-ketone (photopolymerization initiator) | 0.50 g |

The above components were stirred and mixed to prepare (7) an optical resin composition which was then poured into a frame of 100 mm in width, 100 mm in length and 0.5 mm in depth, and the resin composition in a state covered at an upper part with an ultraviolet transmitting glass was irradiated with 2,000 mJ ultraviolet ray from an ultraviolet irradiator to yield a transparent sheet (optical resin material). The curing shrinkage of this resin composition was 5.7%, and the sheet had a total light transmittance of 92% and a birefringence of 0.6 nm. Then, this sheet was stuck to a float glass of 2.8 mm in thickness for shield glass, further stuck to a glass of 0.7 mm in thickness, and subjected to an impact resistance test in the same manner as in Example 1. As a result, the shield glass was not broken at 1.0 J but broken at 1.25 J.

The resin composition was poured into a frame of 40 mm in width, 40 mm in length and 10 mm in depth, and the composition in a state covered at an upper part with an ultraviolet transmitting glass was irradiated with 9,000 mJ ultraviolet ray from an ultraviolet irradiator to prepare a sample for rubber hardness measurement, and this sample when measured for its rubber hardness indicated a rubber hardness of 22.

Example 14

| | |
|---|---|
| The copolymer in Example 12 | 40.5 g |
| 2-Ethylhexyl acrylate (AA monomer) | 34.65 g |
| 2-Hydroxyethyl acrylate (HA monomer) | 14.85 g |
| 1,6-Hexanediol diacrylate | 10.00 g |
| 1-Hydroxy-cyclohexyl-phenyl-ketone (photopolymerization initiator) | 0.50 g |

The above components were stirred and mixed to prepare (8) an optical resin composition which was then poured into a frame of 100 mm in width, 100 mm in length and 0.5 mm in depth, and the resin composition in a state covered at an upper part with an ultraviolet transmitting glass was irradiated with 2,000 mJ ultraviolet ray from an ultraviolet irradiator to yield a transparent sheet (optical resin material). The curing shrinkage of this resin composition was 6.1% and the total light transmittance of the sheet was 91%. Then, this sheet was stuck to a float glass of 2.8 mm in thickness for shield glass, further stuck to a glass of 0.7 mm in thickness, and subjected to an impact resistance test in the same manner as in Example 1. As a result, the shield glass was not broken at 0.5 J but broken at 0.75 J.

The resin composition was poured into a frame of 40 mm in width, 40 min length and 10 min depth, and the composition in a state covered at an upper part with an ultraviolet transmitting glass was irradiated with 9,000 mJ ultraviolet ray from an ultraviolet irradiator to prepare a sample for rubber hardness measurement, and this sample when measured for its rubber hardness indicated a rubber hardness of 38.

Example 15

(6) The optical resin composition in Example 12 was poured into a frame of 100 mm in width, 100 mm in length and 0.15 mm in depth, and the resin composition in a state covered at an upper part with an ultraviolet transmitting glass was irradiated with 2,000 mJ ultraviolet ray from an ultraviolet irradiator to yield a transparent sheet. Then, this sheet was stuck to a float glass of 2.8 mm in thickness for shield glass, further stuck to a glass of 0.7 mm in thickness, and subjected to an impact resistance test in the same manner as in Example 1. As a result, the shield glass was not broken at 0.75 J but broken at 1.0 J.

Example 16

A sheet prepared in the same manner as in Example 12 was stuck to a float glass of 6.0 mm in thickness for shield glass, further stuck to a glass of 0.7 mm in thickness, and subjected to an impact resistance test in the same manner as in Example 1. As a result, the shield glass was not broken at 2.75 J but broken at 3.0 J.

Example 17

A sheet prepared in the same manner as in Example 12 was stuck to a float glass of 1.3 mm in thickness for shield glass, further stuck to a glass of 0.7 mm in thickness, and subjected to an impact resistance test in the same manner as in Example 1. As a result, the shield glass was not broken at 0.4 J but broken at 0.5 J.

Example 18

A strip of 0.5 mm in thickness and 5 mm in width was stuck as a frame to all sides of an AG-treated polarization plate stuck to the surface of a liquid crystal display cell of 32 inches in diagonal length. (6) The same optical resin composition as in Example 12 was poured into the frame, and then its surface was covered so as not to contain bubbles with a soda glass of 32 inches in diagonal length and 2.8 mm in thickness on which an antireflective layer had been formed. Then, the resin was cured by irradiation with an integrated exposure of 2,000 mJ ultraviolet ray from a conveyor ultraviolet irradiator using a metal halide lamp, thereby giving a liquid crystal display cell having an optical resin material and a transparent protective substrate. This liquid crystal display cell was set in a body having a backlight unit and a driving circuit to produce a liquid crystal display (image display device).

This liquid crystal display was free of color change resulting from coloring of the resin material therein and did not show releasing or floating, in the interface, of a liquid crystal display shock absorber or the transparent protective substrate. There was no image deterioration due to ghost image, and upon touching the surface, there was no image deterioration attributable to sagging of the panel.

Example 19

The same transparent sheet as obtained in Example 12 was obtained. This sheet was transparent even after a moisture absorption test. Then, this sheet was stuck to an electromagnetic shielding layer of an electromagnetic shielding film U (TT42-01) A manufactured by Hitachi Chemical Co., Ltd. to prepare an optical filter having electromagnetic shielding property. When this filter was measured in the following impact resistance test, the glass was not broken with an impact of 1.1 J but broken with an impact of 1.2 J. Breakage of the resin sheet was not observed.

—Impact Resistance Test—

In the impact resistance test, the resin sheet stuck to the electromagnetic shielding film was further stuck to a soda glass of 2.8 mm in thickness, and a steel ball was dropped onto it to evaluate impact resistance. The impact was increased by 0.1 J increments, and the strength of impact just before the glass or the resin sheet had been broken was regarded as impact resistance.

Example 20

| | |
|---|---|
| The copolymer in Example 12 | 19.75 g |
| 2-Ethylhexyl acrylate (AA monomer) | 55.50 g |
| 2-Hydroxyethyl acrylate (HA monomer) | 23.75 g |
| 1,6-Hexanediol diacrylate | 1.00 g |
| 1-Hydroxy-cyclohexyl-phenyl-ketone (photopolymerization initiator) | 0.50 g |

A transparent sheet (optical resin material) was prepared in the same manner as in Example 12 except that the above components were used to prepare (9) an optical resin composition. This sheet was transparent and maintained transparency even after a moisture absorption test. The curing shrinkage of this resin composition was 9.6% and the total light transmittance of the sheet was 92%. Then, this sheet was stuck to an electromagnetic shielding layer of an electromagnetic shielding film U (TT42-01) A manufactured by Hitachi Chemical Co., Ltd. and subjected to an impact resistance test in the same manner as in Example 19. As a result, the glass was not broken with an impact of 1.1 J but broken with an impact of 1.2 J. Breakage of the resin sheet was not observed.

Example 21

| | |
|---|---|
| The copolymer in Example 12 | 54.50 g |
| 2-Ethylhexyl acrylate (AA monomer) | 31.25 g |
| 2-Hydroxyethyl acrylate (HA monomer) | 13.25 g |
| 1,6-Hexanediol diacrylate | 1.00 g |
| 1-Hydroxy-cyclohexyl-phenyl-ketone (photopolymerization initiator) | 0.50 g |

A transparent sheet (optical resin material) was prepared in the same manner as in Example 12 except that the above components were used to prepare (10) an optical resin composition. This sheet was transparent and maintained transparency even after a moisture absorption test. The curing shrinkage of this resin composition was 5.0% and the total light transmittance of the sheet was 92%. Then, this sheet was stuck to an electromagnetic shielding layer of an electromagnetic shielding film U (TT42-01) A manufactured by Hitachi Chemical Co., Ltd. and subjected to an impact resistance test in the same manner as in Example 19. As a result, the glass was not broken with an impact of 1.1 J but broken with an impact of 1.2 J. Breakage of the resin sheet was not observed.

Example 22

Synthesis of Acrylate Derivative Polymer

A 2-ethylhexyl acrylate/2-hydroxyethyl acrylate copolymer (weight-average molecular weight of 200,000) was obtained in the same manner as in Example 1 except that 102.0 g of 2-ethylhexyl acrylate (AA monomer) and 18.0 g of 2-hydroxyethyl acrylate (HA monomer) were used as initial monomers and 25.5 g of 2-ethylhexyl acrylate and 4.5 g of 2-hydroxyethyl acrylate were used as additional monomers. (Preparation of Optical Resin Composition to Preparation of Transparent Sheet)

| | |
|---|---|
| The above copolymer | 44.50 g |
| 2-Ethylhexyl acrylate (AA monomer) | 46.25 g |
| 2-Hydroxyethyl acrylate (HA monomer) | 8.25 g |
| 1,6-Hexanediol diacrylate | 1.00 g |
| 1-Hydroxy-cyclohexyl-phenyl-ketone (photopolymerization initiator) | 0.50 g |

A transparent sheet (optical resin material) was prepared in the same manner as in Example 12 except that the above components were used to prepare (11) an optical resin composition. This sheet was transparent and maintained transparency even after a moisture absorption test. The curing shrinkage of this resin composition was 5.4% and the total light transmittance of the sheet was 92%. Then, this sheet was stuck to an electromagnetic shielding layer of an electromagnetic shielding film U (TT42-01) A manufactured by Hitachi Chemical Co., Ltd. and subjected to an impact resistance test in the same manner as in Example 19. As a result, the glass was not broken with an impact of 1.3 J but broken with an impact of 1.4 J. Breakage of the resin sheet was not observed.

Example 23

Synthesis of Acrylate Derivative Polymer

A 2-ethylhexyl acrylate/2-hydroxyethyl acrylate copolymer (weight-average molecular weight of 350,000) was obtained in the same manner as in Example 1 except that 60.0 g of 2-ethylhexyl acrylate (AA monomer) and 60.0 g of 2-hydroxyethyl acrylate (HA monomer) were used as initial monomers and 15.0 g of 2-ethylhexyl acrylate and 15.0 g of 2-hydroxyethyl acrylate were used as additional monomers. (Preparation of Optical Resin Composition to Preparation of Transparent Sheet)

| | |
|---|---|
| The above copolymer | 44.50 g |
| 2-Ethylhexyl acrylate (AA monomer) | 27.25 g |
| 2-Hydroxyethyl acrylate (HA monomer) | 27.25 g |
| 1,6-Hexanediol diacrylate | 1.00 g |
| 1-Hydroxy-cyclohexyl-phenyl-ketone (photopolymerization initiator) | 0.50 g |

A transparent sheet (optical resin material) was prepared in the same manner as in Example 12 except that the above components were used to prepare an optical resin composition (12). This sheet was transparent and maintained transparency even after a moisture absorption test. Then, this sheet was stuck to an electromagnetic shielding layer of an electromagnetic shielding film U (TT42-01) A manufactured by Hitachi Chemical Co., Ltd. and subjected to an impact resistance test in the same manner as in Example 19. As a result, the glass was not broken with an impact of 1.1 J but broken with an impact of 1.2 J. Breakage of the resin sheet was not observed.

Example 24

A transparent sheet (optical resin material) was prepared in the same manner as in Example 12 except that an optical resin composition (6)' using bis(2,4,6-trimethyl benzoyl)-phenylphosphine oxide was used as the photopolymerization initiator in place of 1-hydroxy-cyclohexyl-phenyl-ketone, a frame of 100 mm in width, 100 mm in length and 3.0 mm in depth was used, and the exposure amount of ultraviolet ray was 4,500 mJ. This sheet was transparent and maintained transparency even after a moisture absorption test. Then, this sheet was stuck to an electromagnetic shielding layer of an electromagnetic shielding film U (TT42-01) A manufactured by Hitachi Chemical Co., Ltd. and subjected to an impact resistance test in the same manner as in Example 19. As a result, the glass was not broken even with an impact of 2.0 J. Breakage of the resin sheet was not observed.

Example 25

A transparent sheet (optical resin material) was prepared in the same manner as in Example 12 except that (6)" an optical resin composition using 2.00 g of oligo(2-hydroxy-2-methyl-1-(4-(1-methylvinyl)phenyl)propanone was used as the photopolymerization initiator in place of 1-hydroxy-cyclohexyl-phenyl-ketone, and the exposure amount of ultraviolet ray was 2,500 mJ. This sheet was transparent and maintained transparency even after a moisture absorption test. Particularly, the odor of this sheet was reduced. Then, this sheet was stuck to an electromagnetic shielding layer of an electromagnetic shielding film U (TT42-01) A manufactured by Hitachi Chemical Co., Ltd. and subjected to an impact resistance test in the same manner as in Example 19. As a result, the glass was not broken with an impact of 1.1 J but broken with an impact of 1.2 J. Breakage of the resin sheet was not observed.

Example 26

A transparent sheet (optical resin material) was prepared in the same manner as in Example 12 except that a frame of 100 mm in width, 100 mm in length and 1.5 mm in depth was used and the exposure amount of ultraviolet ray was 3,500 mJ. This sheet was transparent and maintained transparency even after a moisture absorption test. Then, this sheet was stuck to an electromagnetic shielding layer of an electromagnetic shielding film U (TT42-01) A manufactured by Hitachi Chemical Co., Ltd. and subjected to an impact resistance test in the same manner as in Example 19. As a result, the glass was not broken even with an impact of 2.0 J. Breakage of the resin sheet was not observed.

Example 27

A transparent sheet (optical resin material) was prepared in the same manner as in Example 12 except that a frame of 100 mm in width, 100 mm in length and 2.0 mm in depth was used and the exposure amount of ultraviolet ray was 4,000 mJ. This sheet was transparent and maintained transparency even after a moisture absorption test. Then, this sheet was stuck to an electromagnetic shielding layer of an electromagnetic shielding film U (TT42-01) A manufactured by Hitachi Chemical Co., Ltd. and subjected to an impact resistance test in the same manner as in Example 19. As a result, the glass was not broken even with an impact of 2.0 J. Breakage of the resin sheet was not observed.

Example 28

| | |
|---|---|
| The copolymer in Example 12 | 40.20 g |
| 2-Ethylhexyl acrylate (AA monomer) | 44.10 g |
| 2-Hydroxyethyl acrylate (HA monomer) | 14.70 g |
| 1,6-Hexanediol diacrylate | 1.00 g |
| 1-Hydroxy-cyclohexyl-phenyl-ketone (photopolymerization initiator) | 0.50 g |

A transparent sheet (optical resin material) was prepared in the same manner as in Example 12 except that the above components were used to prepare (13) an optical resin composition. This sheet was transparent and maintained transparency even after a moisture absorption test. Then, this sheet was stuck to an electromagnetic shielding layer of an electromagnetic shielding film U (TT42-01) A manufactured by Hitachi Chemical Co., Ltd. and subjected to an impact resistance test in the same manner as in Example 19. As a result, the glass was not broken with an impact of 1.1 J but broken with an impact of 1.2 J. Breakage of the resin sheet was not observed.

Reference Example 2

| The copolymer in Example 12 | 44.50 g |
|---|---|
| 2-Ethylhexyl acrylate | 54.50 g |
| 2-Hydroxyethyl acrylate | 13.25 g |
| 1,6-Hexanediol diacrylate | 1.00 g |
| 1-Hydroxy-cyclohexyl-phenyl-ketone | 0.50 g |

A sheet was prepared in the same manner as in Example 12 except that the above components were used to prepare (14) an optical resin composition. The resulting sheet had been clouded.

Reference Example 3

| The copolymer in Example 12 | 44.50 g |
|---|---|
| 2-Ethylhexyl acrylate | 54.50 g |
| 1,6-Hexanediol diacrylate | 1.00 g |
| 1-Hydroxy-cyclohexyl-phenyl-ketone | 0.50 g |

A sheet was prepared in the same manner as in Example 12 except that the above components were used to prepare (15) an optical resin composition. The resulting sheet had been clouded.

From the results in Reference Examples 2 and 3, it can be seen that the transparency of the sheet just after production is decreased as the difference in numerical value between P and M in the formula (I) increases.

Reference Example 4

A copolymer (weight-average molecular weight of 220,000) was obtained in the same manner as in Example 12 except that 108.0 g of 2-ethylhexyl acrylate and 12.0 g of 2-hydroxyethyl acrylate were used as initial monomers and 27.0 g of 2-ethylhexyl acrylate and 3.0 g of 2-hydroxyethyl acrylate were used as additional monomers.

| The copolymer above | 49.50 g |
|---|---|
| 2-Ethylhexyl acrylate | 44.50 g |
| 2-Hydroxyethyl acrylate | 5.00 g |
| 1,6-Hexanediol diacrylate | 1.00 g |
| 1-Hydroxy-cyclohexyl-phenyl-ketone | 0.50 g |

A sheet was prepared in the same manner as in Example 12 except that the above components were used to prepare (16) an optical resin composition. The resulting sheet was transparent but became clouded after a moisture absorption test.

Reference Example 5

Preparation of Acrylate Derivative Polymer

A copolymer was obtained in the same manner as in Example 12 except that 12.0 g of 2-ethylhexyl acrylate (AA monomer) and 108.0 g of 2-hydroxyethyl acrylate (HA monomer) were used as initial monomers and 3.0 g of 2-ethylhexyl acrylate and 27.0 g of 2-hydroxyethyl acrylate were used as additional monomers.

(Preparation of Optical Resin Composition to Preparation of Transparent Sheet)

| The copolymer above | 49.50 g |
|---|---|
| 2-Ethylhexyl acrylate | 5.00 g |
| 2-Hydroxyethyl acrylate | 44.50 g |
| 1,6-Hexanediol diacrylate | 1.00 g |
| 1-Hydroxy-cyclohexyl-phenyl-ketone | 0.50 g |

A sheet was prepared in the same manner as in Example 12 except that the above components were used to prepare (17) an optical resin composition. The resulting sheet was transparent, but after a moisture absorption test, its outside dimension was increased by 5% or more to generate swelling in the periphery thereof.

From the results in Reference Examples 4 and 5, it is estimated that when the balance between AA monomer and HA monomer is bad, the product may become clouded or undergo a significant dimensional change. However, even in such case, it is considered that there is no problem as long as the product is used in a hermetically sealed site where it hardly absorbs moisture.

Comparative Example 2

Preparation of Optical Resin Composition to Preparation of Transparent Sheet

| 2-Ethylhexyl acrylate | 84.15 g |
|---|---|
| 2-Hydroxyethyl acrylate | 14.85 g |
| 1,6-Hexanediol diacrylate | 1.00 g |
| 1-Hydroxy-cyclohexyl-phenyl-ketone | 0.50 g |

A sheet was prepared in the same manner as in Example 12 except that the above components were used to prepare an optical resin composition (18). This sheet was transparent and maintained transparency even after a moisture absorption test. Then, this sheet was stuck to an electromagnetic shielding layer of an electromagnetic shielding film U (TT42-01) A manufactured by Hitachi Chemical Co., Ltd. and subjected to an impact resistance test in the same manner as in Example 19. As a result, the resin sheet was broken with an impact of 0.5 J.

Comparative Example 3

An electromagnetic shielding film U (TT42-01) A was stuck directly on glass such that its electromagnetic shielding layer was contacted with the glass, and then examined for its impact resistance in the same manner as in Example 19. As a result, the glass was broken with an impact of 0.5 J.

Example 29

| The copolymer in Example 12 | 10.00 g |
|---|---|
| 2-Ethylhexyl acrylate | 62.30 g |
| 2-Hydroxyethyl acrylate | 26.70 g |
| 1,6-Hexanediol diacrylate | 1.00 g |
| 1-Hydroxy-cyclohexyl-phenyl-ketone | 0.50 g |

A sheet was prepared in the same manner as in Example 12 except that the above components were used to prepare an optical resin composition (19). The resulting sheet was transparent and maintained transparency even after a moisture absorption test. Then, this sheet was stuck to an electromagnetic shielding layer of an electromagnetic shielding film U (TT42-01) A manufactured by Hitachi Chemical Co., Ltd. and subjected to an impact resistance test in the same manner as in Example 19. As a result, the glass was not broken with an impact of 0.7 J but broken with an impact of 0.8 J.

Example 30

A transparent sheet was obtained in the same manner as in Example 1 except that 0.40 g of lauryl peroxide was used in place of 0.50 g of 1-hydroxy-cyclohexyl-phenyl-ketone in Example 1 to prepare (1) an optical resin composition' and also that heating for 3 hours in a fan oven at 70° C. was conducted in place of irradiation with ultraviolet ray ((1)' the optical resin composition was poured into a frame and heated in a state covered at an upper part with an ultraviolet transmitting glass). This sheet showed high impact resistance similar to that of the sheet in Example 1, and did not show white turbidity upon moisture absorption.

Example 31

A transparent sheet was obtained in the same manner as in Example 3 except that 0.10 g of t-hexylperoxy pivalate was further added to the resin composition in Example 3 to prepare (3)' an optical resin composition and the sheet was irradiated with ultraviolet ray and then further heated at 70° C. for 1 hour in a nitrogen oven (the optical resin composition was poured into a frame and heated in a state covered at an upper part with an ultraviolet transmitting glass). This transparent sheet did not show deterioration in characteristics by addition of the thermopolymerization initiator or by heating, and showed high impact resistance and transparency upon moisture absorption, similar to those of the transparent sheet in Example 3.

Example 32

A transparent sheet was obtained in the same manner as in Example 4 except that 0.20 g of 2,2'-azobisisobutyronitrile was used in place of 0.50 g of 1-hydroxy-cyclohexyl-phenyl-ketone in Example 4 to prepare (4)' an optical resin composition, and also that heating for 3 hours in a fan oven at 70° C. was conducted in place of irradiation with ultraviolet ray (the optical resin composition was poured into a frame and heated in a state covered at an upper part with an ultraviolet transmitting glass). This transparent sheet showed high impact resistance similar to that of the transparent sheet in Example 1, and did not show white turbidity upon moisture absorption.

Example 33

A transparent sheet was obtained in the same manner as in Example 4 except that 0.05 g of 2,2'-azobis(2,4-dimethylvaleronitrile) was further added to the optical resin composition in Example 4 to prepare (4)" an optical resin composition and the sheet was irradiated with 300 mJ ultraviolet ray and then further heated at 70° C. for 1 hour in a nitrogen oven (the optical resin composition was poured into a frame and heated in a state covered at an upper part with an ultraviolet transmitting glass). This transparent sheet did not show deterioration in characteristics by addition of the thermopolymerization initiator or by heating, and showed high impact resistance and transparency upon moisture absorption, similar to those of the transparent sheet in Example 4.

Example 34

A frame was prepared in the same manner as in Example 7, (3)' the same optical resin composition as in Example 31 was poured into the frame and then covered with the same glass as in Example 7. Then, the sample was heated at 70° C. for 1 hour with a fan oven, thereby curing the resin to produce a liquid crystal display cell having an optical resin material and a transparent protective substrate. This liquid crystal display cell was set in a body having a backlight unit or a driving circuit to produce a liquid crystal display (image display device). This liquid crystal display was free of color change resulting from coloring of the resin material therein and did not show releasing or floating, in the interface, of the optical resin material or the transparent protective substrate, similarly to Example 7. There was no image deterioration due to ghost image, and upon touching the surface, there was no deterioration in image quality by sagging of the panel.

Example 35

A frame was prepared in the same manner as in Example 7, (1)' the same optical resin composition as in Example 30 was poured into the frame and then covered without bubbles on the surface with an acrylic plate of 3 mm in thickness. Then, the sample was heated at 70° C. for 1 hour with a fan oven, thereby curing the resin to produce a liquid crystal display cell having an optical resin material and a transparent protective substrate. This liquid crystal display cell was set in a body having a backlight unit or a driving circuit to produce a liquid crystal display (image display device). This liquid crystal display was free of color change resulting from coloring of the resin material therein and did not show releasing or floating, in the interface, of the optical resin material or the transparent protective substrate, similarly to Examples 1 or 7. There was no image deterioration due to ghost image, and upon touching the surface, there was no deterioration in image quality by sagging of the panel.

Example 36

A sheet prepared in the same manner as in Example 30 was stuck to the electromagnetic shielding layer side of a substrate film in an electromagnetic shielding film U (TT42-01) A manufactured by Hitachi Chemical Co., Ltd. to prepare an optical filter having electromagnetic shielding property. When this filter was subjected to an impact resistance test, the glass was not broken with an impact of 0.8 J but broken with an impact of 0.9 J, similarly to Example 8. Breakage of the resin sheet was not observed.

Example 37

The resin composition in Example 33 was applied onto a polyester film, then covered with a cover film, irradiated with 300 mJ ultraviolet ray thereby eliminating the fluidity of the resin, and cured for 1 hour in a hardening furnace at 70° C. to produce a sheet of 42-inch size. This sheet was stuck by a roller laminator on a transparent resin layer of an electromagnetic shielding film U (TT42-01) A manufactured by Hitachi Chemical Co., Ltd. to produce an electromagnetic shielding film with an impact-absorbing layer. The substrate polyester film side of the electromagnetic shielding film was further stuck by a roller laminator on an antireflective film having an infrared shielding function or a visible light wavelength selection absorption function (Clearlas NIR-SA, manufactured by SUMITOMO OSAKA CEMENT Co., Ltd.) to manufacture a directly stuck filter for plasma display (optical filter). This directly stuck filter was stuck by a laminator to a plasma display panel via the adhesion of the impact-absorbing layer, and when an image was displayed, a display excellent in contrast without a ghost image was obtained similarly to Example 10.

Example 38

| | |
|---|---|
| The copolymer in Example 1 | 24.88 g |
| 2-Ethylhexyl acrylate (AA monomer) | 28.65 g |
| 2-Hydroxyethyl acrylate (HA monomer) | 11.14 g |
| Polyurethane acrylate in Example 1 | 34.83 g |
| 1-Hydroxy-cyclohexyl-phenyl-ketone (photopolymerization initiator) | 0.50 g |

The above components were stirred and mixed to prepare (20) an optical resin composition which was then poured into a frame of 100 mm in width, 100 mm in length and 0.5 mm in depth, and the resin composition in a state covered at an upper part with an ultraviolet transmitting glass was irradiated with 2,000 mJ ultraviolet ray from an ultraviolet irradiator to yield a transparent sheet. Then, this sheet was stuck to a float glass of 2.8 mm in thickness for shield glass, further stuck to a glass of 0.7 mm in thickness, and subjected to an impact resistance test in the same manner as in Example 1. As a result, the shield glass was not broken at 0.6 J but broken at 0.75 J. This sheet maintained transparency even after a moisture absorption test.

Example 39

| | |
|---|---|
| The copolymer in Example 1 | 24.88 g |
| 2-Ethylhexyl acrylate (AA monomer) | 25.86 g |
| 2-Hydroxyethyl acrylate (HA monomer) | 13.93 g |
| Polyurethane acrylate in Example 1 | 34.83 g |
| 1-Hydroxy-cyclohexyl-phenyl-ketone (photopolymerization initiator) | 0.50 g |

The above components were stirred and mixed to prepare (21) an optical resin composition which was then poured into a frame of 100 mm in width, 100 mm in length and 0.5 mm in depth, and the resin composition in a state covered at an upper part with an ultraviolet transmitting glass was irradiated with 2,000 mJ ultraviolet ray from an ultraviolet irradiator to yield a transparent sheet. Then, this sheet was stuck to a float glass of 2.8 mm in thickness for shield glass, further stuck to a glass of 0.7 mm in thickness, and subjected to an impact resistance test in the same manner as in Example 1. As a result, the shield glass was not broken at 0.6 J but broken at 0.75 J. This sheet maintained transparency even after a moisture absorption test.

Example 40

| | |
|---|---|
| The copolymer in Example 1 | 24.88 g |
| 2-Ethylhexyl acrylate (AA monomer) | 31.04 g |
| 2-Hydroxyethyl acrylate (HA monomer) | 8.75 g |
| Polyurethane acrylate in Example 1 | 34.83 g |
| 1-Hydroxy-cyclohexyl-phenyl-ketone (photopolymerization initiator) | 0.50 g |

The above components were stirred and mixed to prepare (22) an optical resin composition which was then poured into a frame of 100 mm in width, 100 mm in length and 0.5 mm in depth, and the resin composition in a state covered at an upper part with an ultraviolet transmitting glass was irradiated with 2,000 mJ ultraviolet ray from an ultraviolet irradiator to yield a transparent sheet. Then, this sheet was stuck to a float glass of 2.8 mm in thickness for shield glass, further stuck to a glass of 0.7 mm in thickness, and subjected to an impact resistance test in the same manner as in Example 1. As a result, the shield glass was not broken at 0.6 J but broken at 0.75 J. This sheet was observed to be turbid just after production, but became transparent after a moisture absorption test.

Example 41

| | |
|---|---|
| The copolymer in Example 1 | 24.88 g |
| 2-Ethylhexyl acrylate (AA monomer) | 34.55 g |
| 2-Hydroxyethyl acrylate (HA monomer) | 5.24 g |
| Polyurethane acrylate in Example 1 | 34.83 g |
| 1-Hydroxy-cyclohexyl-phenyl-ketone (photopolymerization initiator) | 0.50 g |

The above components were stirred and mixed to prepare (23) an optical resin composition which was then poured into a frame of 100 mm in width, 100 mm in length and 0.5 mm in depth, and the resin composition in a state covered at an upper part with an ultraviolet transmitting glass was irradiated with 2,000 mJ ultraviolet ray from an ultraviolet irradiator to yield a transparent sheet. Then, this sheet was stuck to a float glass of 2.8 mm in thickness for shield glass, further stuck to a glass of 0.7 mm in thickness, and subjected to an impact resistance test in the same manner as in Example 1. As a result, the shield glass was not broken at 0.6 J but broken at 0.75 J. This sheet was slightly turbid just after production and maintained turbidity after a moisture absorption test.

From the results in Examples 40 and 41, it can be seen that as the difference in numerical value between P and M in the formula (I) is increased, the transparency of the sheet just after production is decreased. However, the degree of turbidity was lower compared from the case of the high-molecular-weight crosslinking agent than the low-molecular-weight, and thus the high-molecular-weight crosslinking agent may be used depending on its grade or the thickness of a sheet.

Example 42

(1) The optical resin composition in Example 1 was poured into a frame of 100 mm in width, 100 mm in length and 0.15 mm in depth, and the resin composition in a state covered at an upper part with an ultraviolet transmitting glass was irradiated with 2,000 mJ ultraviolet ray from an ultraviolet irradiator to yield a transparent sheet. Then, this sheet was stuck to a float glass of 2.8 mm in thickness for shield glass, further stuck to a glass of 0.7 mm in thickness, and subjected to an impact resistance test in the same manner as in Example 1. As a result, the shield glass was neither broken at 0.75 J nor broken even at 1.0 J.

The test methods in the Examples, Comparative Examples and Reference Examples are shown below. The results in these tests are shown in Tables 1 to 6.

In Tables 1 to 6, *1 to *4 are the following treatments conducted before the impact resistance test in the Examples and Comparative Examples, respectively.

*1: A sheet was stuck to a float glass of 2.8 mm in thickness for shield glass and further stuck to a glass of 0.7 mm in thickness, followed by being subjected to the impact resistance test.

*2: A sheet was stuck to a float glass of 6.0 mm in thickness for shield glass and further stuck to a glass of 0.7 mm in thickness, followed by being subjected to the impact resistance test.

*3: A sheet was stuck to a float glass of 1.3 mm in thickness for shield glass and further stuck to a glass of 0.7 mm in thickness, followed by being subjected to the impact resistance test.

*4: A sheet was stuck to the electromagnetic shielding layer side of a substrate film in the electromagnetic shielding film to prepare an optical filter having electromagnetic shielding property, followed by being subjected to the impact resistance test.

(Measurement of Weight-Average Molecular Weight)

Weight-average molecular weight was measured by gel permeation chromatography with THF as solvent and determined using a calibration curve of standard polystyrenes.

(Measurement of Rubber Hardness)

A sample of 40 mm in width, 40 mm in length and 10 mm in width was used and measured for its rubber hardness with a spring-type hardness meter (WR-104A) manufactured by Nishi Tokyo Seiki Co., Ltd. The measurement was carried out at 5 positions, and an average value at the 5 positions was indicated as rubber hardness.

(Curing Shrinkage)

From the density of a ultraviolet curable liquid measured with a picnometer and the density of its ultraviolet cured product measured with an electronic density meter SD-200L (manufactured by ALFA MIRAGE Co., LTd.), curing shrinkage was calculated using the following equation.

Curing shrinkage=(density of ultraviolet cured product−density of ultraviolet curable liquid)/density of ultraviolet cured product×100

(Birefringence)

A ultraviolet cured product was cut in a size of 40×40 mm and measured for its phase contrast with Ellipsometer AEP-100 (manufactured by Shimadzu Corporation), and the measured phase contrast was indicated as birefringence.

(Moisture Absorption Test)

In the moisture absorption test, a resin sheet was placed in a high temperature/high humidity chamber at 60° C. and 90% RH for 50 hours and the evaluation method was by visual observation. After the test, its total light transmittance was measured.

(Transparency)

A prepared sheet was evaluated for its transparency under the following evaluation criteria visually.

—Evaluation Criteria—
A: Recognized to be colorless and transparent.
B: Slightly turbid, but at a level practically unproblematic depending on grade or the thickness of the sheet.
C: Apparently turbid and at an unusable level.

(Elastic Modulus)

A ultraviolet cured product was cut in a size of 3 mm in width and 20 mm in length and measured by a stretching method at a measuring frequency of 1 Hz with RSA-III manufactured by TA Instruments.

(Total Light Transmittance)

Total light transmittance was measured with a color difference/turbidity measuring instrument COH-300A (manufactured by Nippon Denshoku Industries Co., Ltd.).

TABLE 1

| | | Example 1 | Example 2 | Example 3 | Example 4 | Example 5 | Example 6 | Example 7 | Example 8 | Example 9 |
|---|---|---|---|---|---|---|---|---|---|---|
| Resin Composition | (A) Acrylate derivative | 39.79 g | 45.54 g | 39.20 g | 47.50 g | 39.79 g | 39.79 g | 39.79 g | 39.79 g | 45.54 g |
| | AA monomer | 27.85 g | 31.88 g | 27.44 g | 33.25 g | 27.85 g | 27.85 g | 27.85 g | 27.85 g | 31.88 g |
| | HA monomer | 11.94 g | 13.66 g | 11.76 g | 14.25 g | 11.94 g | 11.94 g | 11.94 g | 11.94 g | 13.66 g |
| | (B) High-molecular-weight crosslinking agent | 34.83 g | 13.86 g | 34.30 g | 5.00 g | 34.83 g | 34.83 g | 34.83 g | 34.83 g | 13.86 g |
| | (B) Low-molecular-weight crosslinking agent | — | — | — | — | — | — | — | — | — |
| | (C) Acrylate derivative polymer | 24.88 g | 39.60 g | 24.50 g | 47.00 g | 24.88 g | 24.88 g | 24.88 g | 24.88 g | 39.60 g |
| | AA monomer | 105.0 g | 105.0 g | 105.0 g | 105.0 g | 105.0 g | 105.0 g | 105.0 g | 105.0 g | 105.0 g |
| | HA monomer | 45.0 g | 45.0 g | 45.0 g | 45.0 g | 45.0 g | 45.0 g | 45.0 g | 45.0 g | 45.0 g |
| | (D) Photopolymerization initiator | 0.50 g | 1.00 g | 2.00 g | 0.50 g | 0.50 g | 0.50 g | 0.50 g | 0.50 g | 1.00 g |
| | (D) Thermopolymerization initiator | — | — | — | — | — | — | — | — | — |
| | P (% by weight) | 30 | 30 | 30 | 30 | 30 | 30 | 30 | 30 | 30 |
| | M (% by weight) | 30 | 30 | 30 | 30 | 30 | 30 | 30 | 30 | 30 |
| | P − M | 0.0 | 0.0 | 0.0 | 0.0 | 0.0 | 0.0 | 0.0 | 0.0 | 0.0 |
| | Resin composition | (1) | (2) | (3) | (4) | (1) | (1) | (1) | (1) | (2) |
| Sheet Evaluation | Film thickness | 0.5 mm | 0.5 mm | 0.5 mm | 0.5 mm | 0.5 mm | 0.5 mm | — | 0.5 mm | 0.5 mm |
| | Impact resistance | 0.6J *1 | 0.5J *1 | 0.5J *1 | 0.5J *1 | 2.75J *2 | 0.4J *3 | — | 0.8J *4 | 0.9J *4 |
| | Rubber hardness | 2 | 0 | 0 | 1 | — | — | — | — | — |
| | Transparency just after production | A | A | A | A | — | — | — | — | — |
| | Transparency | A | A | A | A | — | — | — | — | — |

TABLE 1-continued

|  |  | Example 1 | Example 2 | Example 3 | Example 4 | Example 5 | Example 6 | Example 7 | Example 8 | Example 9 |
|---|---|---|---|---|---|---|---|---|---|---|
| Device Evaluation | after moisture absorption test Film thickness | — | — | — | — | — | — | 0.5 mm There was no color change, and there did not occur release etc. in an interface with the transparent protective substrate. A ghost image did not occur, and deterioration in image quality was not observed either. (Visibility was not lowered.) | — | — |

TABLE 2

|  |  | Example 10 | Reference Example 1 | Example 11 | Comparative Example 1 | Example 12 | Example 13 | Example 14 |
|---|---|---|---|---|---|---|---|---|
| Resin Composition | (A) Acrylate derivative | 39.79 g | 38.50 g | 39.79 g | — | 54.50 g | 52.25 g | 49.50 g |
|  | AA monomer | 27.85 g | 26.95 g | 27.85 g |  | 38.25 g | 36.58 g | 34.65 g |
|  | HA monomer | 11.94 g | 11.55 g | 11.94 g |  | 16.25 g | 15.67 g | 14.85 g |
|  | (B) High-molecular-weight crosslinking agent | 34.83 g | — | 34.83 g | — | — | — | — |
|  | (B) Low-molecular-weight crosslinking agent | — | 30.00 g | — | — | 1.00 g | 5.00 g | 10.00 g |
|  | (C) Acrylate derivative polymer | 24.88 g | 31.50 g | 24.88 g | — | 44.50 g | 42.75 g | 40.50 g |
|  | AA monomer | 105.0 g | 105.0 g | 105.0 g |  | 105.0 g | 105.0 g | 105.0 g |
|  | HA monomer | 45.0 g | 45.0 g | 45.0 g |  | 45.0 g | 45.0 g | 45.0 g |
|  | (D) Photopolymerization initiator | 0.50 g | 0.50 g | 0.50 g | — | 0.50 g | 0.50 g | 0.50 g |
|  | (D) Thermopolymerization initiator | — | — | — | — | — | — | — |
|  | P (% by weight) | 30 | 30 | 30 |  | 30 | 30 | 30 |
|  | M (% by weight) | 30 | 30 | 30 |  | 30 | 30 | 30 |
|  | P − M | 0.0 | 0.0 | 0.0 |  | 0.2 | 0.0 | 0.0 |
|  | Resin composition | (1) | (5) | (1) | — | (6) | (7) | (8) |
| Sheet Evaluation | Film thickness | — | 0.5 mm | 1.0 mm | 0 mm | 0.5 mm | 0.5 mm | 0.5 mm |
|  | Impact resistance |  | <0.25J *1 | 0.25J *1 | <0.25J *1 | 0.6J *1 | 1.01J * | 0.5J *1 |
|  | Rubber hardness |  | 75 | — | — | 2 | 22 | 38 |
|  | Transparency just after production |  | A | — | — | A | A | A |
|  | Transparency after moisture absorption test |  | A | — | — | A | A | A |
| Device Evaluation | Film thickness | 0.5 mm Display excellent in contrast without ghost image was obtained. (Visibility was improved.) | — | — | — | — | — | — |

TABLE 3

|  |  | Example 15 | Example 16 | Example 17 | Example 18 | Example 19 | Example 20 | Example 21 | Example 22 | Example 23 |
|---|---|---|---|---|---|---|---|---|---|---|
| Resin Composition | (A) Acrylate derivative | 54.50 g | 54.50 g | 54.50 g | 54.50 g | 54.50 g | 79.25 g | 44.50 g | 54.50 g | 54.50 g |
|  | AA monomer | 38.25 g | 38.25 g | 38.25 g | 38.25 g | 38.25 g | 55.50 g | 31.25 g | 46.25 g | 27.25 g |
|  | HA monomer | 16.25 g | 16.25 g | 16.25 g | 16.25 g | 16.25 g | 23.75 g | 13.25 g | 8.25 g | 27.25 g |
|  | (B) High-molecular-weight crosslinking agent | — | — | — | — | — | — | — | — | — |
|  | (B) Low-molecular-weight crosslinking agent | 1.00 g | 1.00 g | 1.00 g | 1.00 g | 1.00 g | 1.00 g | 1.00 g | 1.00 g | 1.00 g |
|  | (C) Acrylate derivative polymer | 44.50 g | 44.50 g | 44.50 g | 44.50 g | 44.50 g | 19.75 g | 54.50 g | 44.50 g | 44.50 g |

TABLE 3-continued

|  |  | Example 15 | Example 16 | Example 17 | Example 18 | Example 19 | Example 20 | Example 21 | Example 22 | Example 23 |
|---|---|---|---|---|---|---|---|---|---|---|
|  | AA monomer | 105.0 g | 105.0 g | 105.0 g | 105.0 g | 105.0 g | 105.0 g | 105.0 g | 127.5 g | 75.0 g |
|  | HA monomer | 45.0 g | 45.0 g | 45.0 g | 45.0 g | 45.0 g | 45.0 g | 45.0 g | 22.5 g | 75.0 g |
|  | (D) Photopolymerization initiator | 0.50 g | 0.50 g | 0.50 g | 0.50 g | 0.50 g | 0.50 g | 0.50 g | 0.50 g | 0.50 g |
|  | (D) Thermopolymerization initiator | — | — | — | — | — | — | — | — | — |
|  | P (% by weight) | 30 | 30 | 30 | 30 | 30 | 30 | 30 | 15 | 50 |
|  | M (% by weight) | 30 | 30 | 30 | 30 | 30 | 30 | 30 | 15 | 50 |
|  | P − M | 0.2 | 0.2 | 0.2 | 0.2 | 0.2 | 0.0 | 0.2 | −0.1 | 0.0 |
|  | Resin composition | (6) | (6) | (6) | (6) | (6) | (9) | (10) | (11) | (12) |
| Sheet Evaluation | Film thickness | 0.15 mm | 0.5 mm | 0.5 mm | — | 0.5 mm | 0.5 mm | 0.5 mm | 0.5 mm | 0.5 mm |
|  | Impact resistance | 0.75J *1 | 2.75J *2 | 0.4J *3 |  | 1.1J *4 | 1.1J *4 | 1.1J *4 | 1.3J *4 | 1.1J *4 |
|  | Rubber hardness | — | — | — |  | — | — | — | — | — |
|  | Transparency just after production | — | — | — |  | — | A | A | A | A |
|  | Transparency after moisture absorption test | — | — | — |  | — | A | A | A | A |
| Device Evaluation | Film thickness | — | — | — | 0.5 mm There was no color change, and there did not occur release etc. in an interface with the transparent protective substrate. A ghost image did not occur, and deterioration in image quality was not observed either. (Visibility was not lowered.) | — | — | — | — | — |

TABLE 4

|  |  | Example 24 | Example 25 | Example 26 | Example 27 | Example 28 | Refernce Example 2 | Reference Example 2 | Reference Example 3 | Reference Example 4 |
|---|---|---|---|---|---|---|---|---|---|---|
| Resin Composition | (A) Acrylate derivative | 54.50 g | 54.50 g | 54.50 g | 54.50 g | 58.80 g | 67.75 g | 54.50 g | 49.50 g | 49.50 g |
|  | AA monomer | 38.25 g | 38.25 g | 38.25 g | 38.25 g | 44.10 g | 54.50 g | 54.50 g | 44.50 g | 5.00 g |
|  | HA monomer | 16.25 g | 16.25 g | 16.25 g | 16.25 g | 14.70 g | 13.25 g | 0.00 g | 5.00 g | 44.50 g |
|  | (B) High-molecular-weight crosslinking agent | — | — | — | — | — | — | — | — | — |
|  | (B) Low-molecular-weight crosslinking agent | 1.00 g | 1.00 g | 1.00 g | 1.00 g | 1.00 g | 1.00 g | 1.00 g | 1.00 g | 1.00 g |
|  | (C) Acrylate derivative polymer | 44.50 g | 44.50 g | 44.50 g | 44.50 g | 40.20 g | 44.50 g | 44.50 g | 49.50 g | 49.50 g |
|  | AA monomer | 105.0 g | 105.0 g | 105.0 g | 105.0 g | 105.0 g | 105.0 g | 105.0 g | 135.0 g | 15.0 g |
|  | HA monomer | 45.0 g | 45.0 g | 45.0 g | 45.0 g | 45.0 g | 45.0 g | 45.0 g | 15.0 g | 135.0 g |
|  | (D) Photopolymerization initiator | 0.50 g | 2.00 g | 0.50 g | 0.50 g | 0.50 g | 0.50 g | 0.50 g | 0.50 g | 0.50 g |
|  | (D) Thermopolymerization initiator | — | — | — | — | — | — | — | — | — |
|  | P (% by weight) | 30 | 30 | 30 | 30 | 30 | 30 | 30 | 10 | 90 |
|  | M (% by weight) | 30 | 30 | 30 | 30 | 25 | 20 | 0 | 10 | 90 |
|  | P − M | 0.2 | 0.2 | 0.2 | 0.2 | 5.0 | 10.4 | 30.0 | −0.1 | 0.1 |
|  | Resin composition | (6)' | (6)'' | (6) | (6) | (13) | (14) | (15) | (16) | (17) |
| Sheet Evaluation | Film thickness | 0.5 mm | 0.5 mm | 1.5 mm | 2.0 mm | 0.5 mm | 0.5 mm | 0.5 mm | 0.5 mm | 0.5 mm |
|  | Impact resistance | 2.0J *4 | 1.1J *4 | 2.0J *4 | 2.0J *4 | 1.1J *4 | ≥0.5J *4 | ≥0.5J *4 | ≥0.5J *4 | ≥0.5J *4 |
|  | Rubber hardness | — | — | — | — | — | — | — | — | — |
|  | Transparency just after production | A | A | A | A | A | C | C | A | A |
|  | Transparency after moisture absorption test | A | A | A | A | A | C | C | C | A |

TABLE 4-continued

|  |  | Example 24 | Example 25 | Example 26 | Example 27 | Example 28 | Refernce Example 2 | Reference Example 2 | Reference Example 3 | Reference Example 4 |
|---|---|---|---|---|---|---|---|---|---|---|
| Device Evaluation | Film thickness | — | — | — | — | — | — | — | — | — |

TABLE 5

|  |  | Comparative Example 2 | Comparative Example 3 | Example 29 | Example 30 | Example 31 | Example 32 | Example 33 | Example 34 | Example 35 | Example 36 |
|---|---|---|---|---|---|---|---|---|---|---|---|
| Resin Composition | (A) Acrylate derivative | 99.00 g | — | 89.00 g | 39.79 g | 39.20 g | 47.50 g | 47.50 g | 39.20 g | 39.79 g | 39.79 g |
|  | AA monomer | 84.15 g |  | 62.30 g | 27.85 g | 27.44 g | 33.25 g | 33.25 g | 27.44 g | 27.85 g | 27.85 g |
|  | HA monomer | 14.85 g |  | 26.70 g | 11.94 g | 11.76 g | 14.25 g | 14.25 g | 11.76 g | 11.94 g | 11.94 g |
|  | (B) High-molecular-weight crosslinking agent | — | — | — | 34.83 g | 34.30 g | 5.00 g | 5.00 g | 34.30 g | 34.83 g | 34.83 g |
|  | (B) Low-molecular-weight crosslinking agent | 1.00 g |  | 1.00 g | — | — | — | — | — | — | — |
|  | (C) Acrylate derivative polymer | — |  | 10.00 g | 24.88 g | 24.50 g | 47.00 g | 47.00 g | 24.50 g | 24.88 g | 24.88 g |
|  | AA monomer |  |  | 105.0 g | 105.0 g | 105.0 g | 105.0 g | 105.0 g | 105.0 g | 105.0 g | 105.0 g |
|  | HA monomer |  |  | 45.0 g | 45.0 g | 45.0 g | 45.0 g | 45.0 g | 45.0 g | 45.0 g | 45.0 g |
|  | (D) Photopolymerization initiator | 0.50 g |  | 0.50 g | — | 2.00 g | — | 0.50 g | 2.00 g | — | — |
|  | (D) Thermopolymerization initiator | — |  | — | 0.40 g | 0.10 g | 0.20 g | 0.05 g | 0.10 g | 0.40 g | 0.40 g |
|  | P (% by weight) | — |  | 30 | 30 | 30 | 30 | 30 | 30 | 30 | 30 |
|  | M (% by weight) |  |  | 30 | 30 | 30 | 30 | 30 | 30 | 30 | 30 |
|  | P − M |  |  | 0.0 | 0.0 | 0.0 | 0.0 | 0.0 | 0.0 | 0.0 | 0.0 |
|  | Resin composition | (18) |  | (19) | (1)' | (3)' | (4)' | (4)'' | (3)' | (1)' | (1)' |
| Sheet Evaluation | Film thickness | 0.5 mm | 0 mm | 0.5 mm | 0.5 mm | 0.5 mm | 0.5 mm | 0.5 mm | — | — | 0.5 mm |
|  | Impact resistance | <0.5J *4 | <0.5J *4 | 0.7J *4 | 0.6J *1 | 0.5J *1 | 0.6J *1 | 0.5J *1 |  |  | 0.8J *4 |
|  | Rubber hardness | — | — | — | — | — | — | — |  |  | — |
|  | Transparency just after production | A | — | A | A | A | A | A |  |  | A |
|  | Transparency after moisture absorption test | A | — | A | A | A | A | A |  |  | A |
| Device Evaluation | Film thickness | — | — | — | — | — | — | — | 0.5 mm There was no color change, and there did not occur release etc. in an interface with the transparent protective substrate. A ghost image did not occur, and deterioration in image quality was not observed either. (Visibility was not lowered.) | 0.5 mm | — |

TABLE 6

|  |  | Example 37 | Example 38 | Example 39 | Example 40 | Example 41 | Example 42 |
|---|---|---|---|---|---|---|---|
| Resin Composition | (A) Acrylate derivative | 47.50 g | 39.79 g | 39.79 g | 39.79 g | 39.79 g | 39.79 g |
|  | AA monomer | 33.25 g | 28.65 g | 25.86 g | 31.04 g | 34.55 g | 27.85 g |
|  | HA monomer | 14.25 g | 11.14 g | 13.93 g | 8.75 g | 5.24 g | 11.94 g |
|  | (B) High-molecular-weight crosslinking agent | 5.00 g | 34.83 g | 34.83 g | 34.83 g | 34.83 g | 34.83 g |
|  | (B) Low-molecular-weight crosslinking agent | — | — | — | — | — | — |
|  | (C) Acrylate derivative polymer | 47.00 g | 24.88 g | 24.88 g | 24.88 g | 24.88 g | 24.88 g |
|  | AA monomer | 105.0 g | 105.0 g | 105.0 g | 105.0 g | 105.0 g | 105.0 g |
|  | HA monomer | 45.0 g | 45.0 g | 45.0 g | 45.0 g | 45.0 g | 45.0 g |
|  | (D) Photopolymerization initiator | 0.50 g | 0.50 g | 0.50 g | 0.50 g | 0.50 g | 0.50 g |
|  | (D) Thermopolymerization initiator | 0.05 g | — | — | — | — | — |
|  | P (% by weight) | 30 | 30 | 30 | 30 | 30 | 30 |

TABLE 6-continued

|  |  | Example 37 | Example 38 | Example 39 | Example 40 | Example 41 | Example 42 |
|---|---|---|---|---|---|---|---|
|  | M (% by weight) | 30 | 28 | 35 | 22 | 13 | 30 |
|  | P − M | 0.0 | 2.0 | −5.0 | 8.0 | 16.8 | 0.0 |
|  | Resin composition | (4)" | (20) | (21) | (22) | (23) | (1) |
| Sheet Evaluation | Film thickness | — | 0.5 mm | 0.5 mm | 0.5 mm | 0.5 mm | 0.15 mm |
|  | Impact resistance |  | 0.6J *1 | 0.6J *1 | 0.6J *1 | 0.6J *1 | 1.0J *1 |
|  | Rubber hardness |  | — | — | — | — | — |
|  | Transparency just after production |  | A | A | B | B |  |
|  | Transparency after moisture absorption test |  | A | A | A | B |  |
| Device Evaluation | Film thickness | 0.5 mm Display excellent in contrast without ghost image was obtained (Visibility was improved.). | — | — | — | — | — |

The invention claimed is:

1. A liquid crystal display comprising a liquid crystal display cell, polarization plates provided on both sides thereof, and a transparent resin layer comprising a cured reaction product of an optical resin composition laminated on one of the polarization plates, the optical resin composition comprising (A) a first acrylate derivative that is a mixture of an alkyl acrylate having an alkyl group containing 4 to 18 carbon atoms and a hydroxyl-containing acrylate represented by the following general formula (I):

$$CH_2=CHCOO(C_mH_{2m}O)_nH \quad \text{General Formula (I)}$$

wherein m is 2, 3, or 4, and n is an integer of 1 to 10, (B) a second acrylate derivative that is a compound having two or more polymerizable unsaturated bonds in its molecule, and (C) an acrylate derivative polymer, wherein:

(B) the second acrylate derivative has a high-molecular-weight of 4000 or more, and a diol component of the second acrylate derivative comprise polypropylene glycol or polytetramethylene glycol.

2. The liquid crystal display according to claim 1, wherein the compounding amounts of the respective components in the optical resin composition based on 100 parts by weight of (A) the first acrylate derivative, (B) the second acrylate derivative and (C) the acrylate derivative polymer in total are (A) 14 to 89.49 parts by weight, (B) 0.1 to 50 parts by weight, and (C) 10 to 80 parts by weight.

3. The liquid crystal display according to claim 1, wherein the compounding amounts of the respective components in the optical resin composition based on 100 parts by weight of (A) the first acrylate derivative, (B) the second acrylate derivative and (C) the acrylate derivative polymer in total are (A) 36 to 84.49 parts by weight, (B) 0.5 to 50 parts by weight and (C) 15 to 60 parts by weight.

4. The liquid crystal display according to claim 1, wherein the optical resin composition further comprises (D) a polymerization initiator.

5. The liquid crystal display according to claim 4, wherein the compounding amount of (D) the polymerization initiator based on 100 parts by weight of (A) the first acrylate derivative, (B) the second acrylate derivative, (C) the acrylate derivative polymer and (D) the polymerization initiator in total is 0.01 to 5 parts by weight.

6. The liquid crystal display according to claim 4, wherein (D1) a photopolymerization initiator is contained as (D) the polymerization initiator.

7. The liquid crystal display according to claim 6, wherein the compounding amount of (D1) the photopolymerization initiator based on 100 parts by weight of (A) the first acrylate derivative, (B) the second acrylate derivative, (C) the acrylate derivative polymer and (D1) the photopolymerization initiator in total is 0.1 to 5 parts by weight.

8. The liquid crystal display according to claim 7, wherein (D1) the photopolymerization initiator is at least one member selected from the group consisting of an α-hydroxyalkyl phenone compound, an acylphosphine oxide compound, oligo(2-hydroxy-2-methyl-1-(4-(1-methylvinyl)phenyl)propanone), and a mixture of oxy-phenyl-acetic acid 2-[2-oxo-2-phenyl-acetoxy-ethoxy]-ethyl ester and oxy-phenyl-acetic acid 2-[2-hydroxy-ethoxy]-ethyl ester.

9. The liquid crystal display according to claim 1, wherein (C) the acrylate derivative polymer is a copolymer of the alkyl acrylate having an alkyl group containing 4 to 18 carbon atoms and the hydroxyl-containing acrylate represented by the general formula (I).

10. The liquid crystal display according to claim 9, wherein a proportion M in percent by mass of the hydroxyl-containing acrylate represented by the general formula (I) in (A) the first acrylate derivative, and a proportion P in percent by mass of the hydroxyl-containing acrylate represented by the general formula (I) in (C) the acrylate derivative polymer satisfy the relationship:

$$-8 \leq (P-M) \leq 8.$$

11. The liquid crystal display according to claim 1, wherein (C) the acrylate derivative polymer is a copolymer obtained by polymerizing an alkyl acrylate having an alkyl group containing 4 to 18 carbon atoms with a hydroxyl-containing acrylate represented by the following general formula (I):

$$CH_2=CHCOO(C_mH_{2m}O)_nH \quad \text{General Formula (I).}$$

12. The liquid crystal display according to claim 1, wherein (B) the second acrylate derivative is a polyurethane di(meth)acrylate.

* * * * *